United States Patent [19]

Rosende

[11] Patent Number: 4,672,948
[45] Date of Patent: Jun. 16, 1987

[54] SOLAR RADIATION COLLECTOR

[76] Inventor: Francisco J. B. Rosende, Ibiza, 37 - 7°Izqda., Madrid 9, Spain

[21] Appl. No.: 784,713

[22] Filed: Oct. 4, 1985

Related U.S. Application Data

[62] Division of Ser. No. 604,603, Apr. 27, 1984, Pat. No. 4,553,531.

[30] Foreign Application Priority Data

| May 10, 1983 | [ES] | Spain | 522.260 |
| Jan. 31, 1984 | [ES] | Spain | 529.345 |
| Mar. 20, 1984 | [ES] | Spain | 530.792 |

[51] Int. Cl.⁴ ............................................. F24J 3/02
[52] U.S. Cl. .................................. 126/438; 126/417; 126/440
[58] Field of Search .............. 126/438, 440, 439, 417; 350/628

[56] References Cited

U.S. PATENT DOCUMENTS

| 3,125,091 | 3/1964 | Sleeper, Jr. | 126/440 |
| 3,203,167 | 8/1965 | Green, Jr. | 126/440 X |
| 4,217,884 | 8/1980 | Strong | 126/442 X |
| 4,280,482 | 7/1981 | Nilsson, Sr. | 126/438 X |
| 4,296,737 | 10/1981 | Silk | 126/438 |

Primary Examiner—Larry Jones
Attorney, Agent, or Firm—Young & Thompson

[57] ABSTRACT

A solar radiation collector comprises a receiver (2-5) through which passes a medium to be heated by solar radiation, and a concentrator (2-1, 2-4) for concentrating solar radiation onto the receiver (2-5). The receiver (2-5) is an elongate structure of polygonal or approximately polygonal section, and the concentrator may be a Fresnel lens system (2-1) and cycloidal mirrors (214). Between the concentrator (2-1, 2-4) and the receiver (2-5) is an intermediate device (2-6) surrounding the receiver (2-5) for reducing energy losses due to radiation emitted by the receiver (2-5). The intermediate device (2-6) has a reflective, internal surface (1-3, 1-5, 1-6) for reflecting back onto the receiver (2-5) radiation emitted therefrom, and at least one window (1-4, 1-7) in its perimeter through which radiation is focussed onto the receiver (2-5) by the concentrator (2-1, 2-4). The internal surface of the intermediate device (2-6), when viewed in section is constituted by curved arcs such as to concentrate onto the receiver (2-5) radiation emitted therefrom. Preferably the arcs of the intermediate device (2-6) are elliptical. Also preferably the external surface of the receiver (1-9), when viewed in section, has at least one of its faces (16-1) constituted by a curved surface. In some forms, the concentrator has instead of a Fresnel lens (2-1) a parabolic mirror (32-1) and a plane mirror (32-2) which is automatically moveable to focus the solar radiation from the parabolic mirror (32-1) onto the receiver (31-3).

8 Claims, 42 Drawing Figures

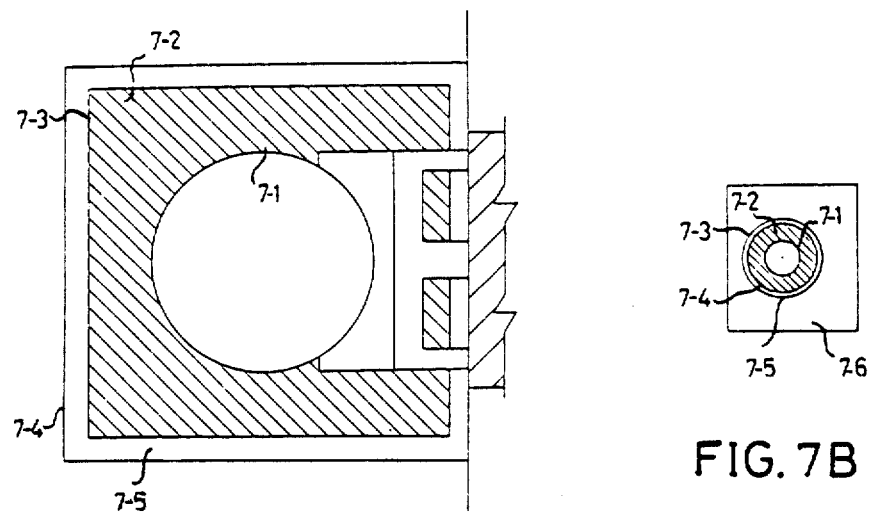
FIG. 7A
FIG. 7B
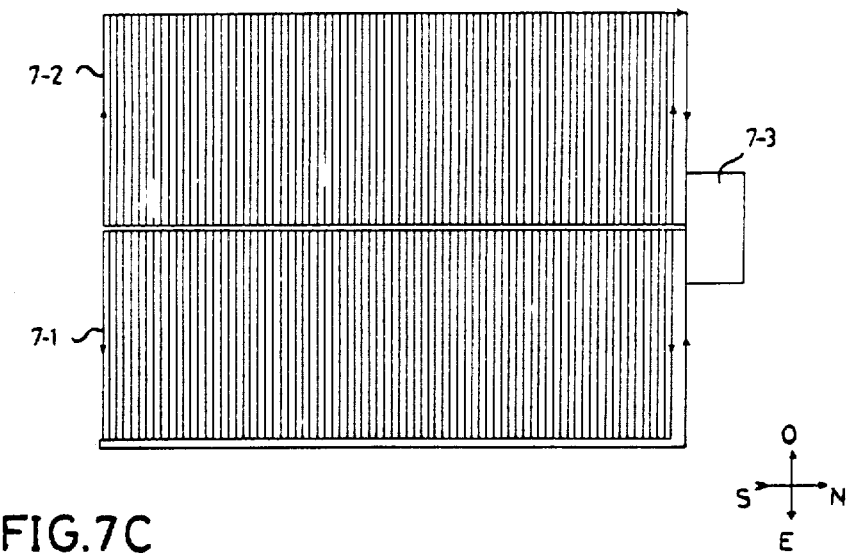
FIG. 7C

SOLAR RADIATION COLLECTOR

This application is a division of application Ser. No. 604,603, filed 4/27/84, now U.S. Pat. No. 4,553,531.

The present invention relates to a solar rndiation collector. Such solar radiation collectors conventionally comprise a receiver throuh which passes a medium to be heated by solar radiation, and a concentrator such as a system of mirrors and lenses, for concentrating solar radiation onto the receiver. The present invention has three main aspects (which may find use in combination or independently) namely the provision of an intermediate device between the concentrator and the receiver of a solar radiation collector, the provision of an improved shape of concentrator in solar radiation collector, and the provision of an improved focussing system in the concentrator of a solar radiation collector.

The invention is particularly applicable for use with a single axis of rotation in the solar tracking of the solar radiation collector, and may operate in such a manner as to reduce losses of calorific energy due to radiation emitted by the receiver. This permits the obtaining of advantages over collectors of this type existing at the moment in that: (a) greater efficiency may be obtained if the collector is used at the same temperatures of the receiver (or of the thermal fluid which circulates through its interior) as at present; or (b) there is the possibility of achieving a greater temperature (maintaining the same efficiency) of the thermal fluid which circulates through the interior of the receiver, in relation to that of the collectors which exist at the moment, which permits the achievement of a better thermodynamic yield of turbines or motors which transform the energy of the said thermal fluid.

There exist various configurations of concentration collectors which can be used with a single axis of rotation in their solar tracking, but the two most important are:

(a) collectors with a reflecting concentrator of parabolic section; and (b) collectors with a refracting concentrator using Fresnel lenses.

These collectors concentrate the solar radiation to a point or focus through which passes the collector tubing. For both of them, the geometrical sections of the receiver are circular or elliptical. These latter permit a reduction to minimum of the receiving surface, but for constructional considerations the form generally used is the circular one.

Both types of collectors may make use of a number of improvements.

Firstly, selective surfaces may be used. With regard to absorption, there may be provided coatings on the receiver which have a low index of reflection for radiations of low wavelengths (approximately those of the visible spectrum) and high for the remainder (although the variation is not abrupt). Examples of this type, with steel as the substrate, are: black chrome, black chrome on nickel, and black nickel. With regard to transmission, there may be provided coatings on the internal surface of transparent tubes of crystal or glass which surround the receiver and which, as in the previous case, have a low index of reflection for radiation of low wavelength and a high one for the remainder. The difference with respect to the previous case is that they do not block the visible radiation, and permit its transmission towards the receiver. They are also called heat mirrors (for their high reflectance of infra-red) or Drude mirrors. The inconvenience of these surfaces which are selective to transmission is that they have a high index of refraction, so that although their index of absorption is low their index of reflection is high (index of refraction much greater than that of air) so that part of the radiatIon of low wavelength is reflected. Examples of this type are films of small thickness of noble metals and oxides of titanium or tin.

Secondly there may be provided tubes of glass or transparent plastics surrounding the receiver, which have a high index of transmission (low absorption) for radiation of low wavelength, and low index for the rest. In reality, for collectors of high concentration, the function of these transparent tubes is only as a support or the membranes which are selective to the transmission, or as a seal for the obtaining of a vacuum between the receiver and the said tube in a form which avoids losses by convection, given that the temperature of the said tubes will be lower than that of the receiver.

On the other hand, to diminish the reflectancy to solar radiation of the interfacial surfaces (glass or membranes which are selec&ive to the transmission), there are various known systems in existence, namely (a) depositing of thin films which have an index of refraction lying between that of air and that of the transparent medium: and (b) chemical engraving of the glasses.

With these collectors, with the combination of the improvements set forth above, due to technical economic reasons, the maximum order of temperatures of use is 300 degrees Centigrade (573,16 degrees Kelvin, for the thermal fluid) with an average efficiency of approximately 80 per cent. For greater temperatures, the efficiency of the collector diminishes, due fundamentally to the fact that the receiver radiates a greater quantity of calorific energy and with a greater proportion of radiation of lower wavelength, so that the selective coatings lose their effect. If, on the other hand, it is taken into account that the last sections of the receiver have an efficiency considerably lower than that of the centre, there can be understood the technical and economic impossibility of using these collectors at greater temperatures than those indicated. Apart from the above considerations with respect to the temperature, the radiation emitted by the receiver is directly proportional to its surface. This depends fundamentally, for the same index of concentration, on the fact that in reality when manufacturing such apparatus there are a series of errors, e.g. of shaping in manufacture, mounting, dispersion of the rays upon reflection by reason of lack of specularity of the reflecting surfaces, and errors in tracking (orientation of the collectors). All of this requires that the surface of the receiver must be increased, with respect to theoretical calculation, if it is desired to capture all the rays which, due to the errors cited above, arrive at the focus with a deviation or in conjunction with an angular increase above the 32.7 minutes sexagesimal with which the solar disc is seen from the earth (approximately). For all of the above, on a predetermined collector which operates at 300 degrees Centigrade, if it is desired to obtain a higher temperature and maintain the efficiency, then a part of the errors recited above must be eliminated, which requires a greater precision in the optics of the concentrators as well as in mounting and tracking, which makes its exploitation not commercial.

The maximum temperature of usc achieved by the thermal fluid which circulates through the interior of the receiver of the concentration collectors existing at the present time is of the order of 250 to 300 degrees Centigrade. The yield in the transformation of energy by means of a turbine which uses water vapour at said temperatures, as thermal fluid, would be low. Due to the above, there are used other thermal fluids (such as toluene, organic vapours) in order to obtain a greater yield in the transformation of energy in the turbine and in this manner make the operation as economic as possible.

It is a principal object of the present invention to provide a solar collector which, by means of a combination of some known devices, explained above, and the addition thereto of some new devices and features, can obtain for the same efficiency as that of the known collectors, greater temperatures of the thermal fluid which circulates through the interior thereof. In the case of using such collectors at the same temperatures as those which currently exist, the efficiency would be increased with respect to collectors embodying the invention.

With the obtaining of greater temperatures of the thermal fluid, the thermo-dynamic yield of the transformation of energy is greater and if the temperature achieved by the thermal fluid is 400 degrees Centigrade (or greater) there is obtained the additional advantage of being able to use the water vapour turbines whose commercial equipment is already in this order of temperatures for the working fluid.

In accordance with the present invention in a first main aspect, there is provided a solar radiation collector comprising a receiver through which passes a medium to be heated by solar radiation, and a concentrator for concentrating solar radiation onto the receiver characterised by an intermediate device between the concentrator and the receiver for reducing energy losses due to radiation emitted by the receiver, the intermediate device having a reflective, internal surface for reflecting back onto the receiver radiation emitted therefrom and having at least one window in its perimeter through which radiation is focussed onto the receiver by the concentrator, the external surface of the receiver, when viewed in section, having a polygonal, or approximately polygonal, form, and the internal surface of the intermediate device, when viewed in section, being constituted by curved arcs such as to concentrate onto the receiver radiation emitted therefrom.

Conveniently, the external surface of the receiver, when viewed in section, may be triangular or approximately triangular.

It is particularly preferred that the said arcs of the internal surface of the intermediate device, when viewed in section, should be elliptical.

In one preferred form, each elliptical arc of the intermediate device, when viewed in section, is positioned opposite either a side, or a junction between two sides, of the polygonal receiver, the said arcs being bounded by lines formed, when viewed in section, by extensions of the sides of the polygonal receiver, the arrangement being such that in the case where an arc of the intermediate device is positioned opposite a side of the receiver, the two focal points of the elliptical arc lie on the said side of the receiver approximately at the ends of the said side, and in the case where an arc of the intermediate device is positioned opposite a junction between two sides of the receiver, the focal points of the elliptical arc lie on a line behind the said junction and formed by joining two further junctions of the sides of the polygonal receiver, the said focal points lying approximately at the ends of the said line.

In one preferred arrangement, the external surface of the receiver, when viewed in section, is triangular, and the interior surface of the intermediate device, when viewed in section, is formed of six elliptical arcs positioned symmetrically around the receiver with alternate arcs facing a side of the triangular section and an apex of the triangular section respectively, each arc which faces a side of the triangular section receiver having its focal points lying on that said side, and each arc which faces an apex of the triangular section receiver having its focal points lying on that side of the triangular section which is opposite to the said apex.

In some preferred arrangements, the external surface of the said receiver, when viewed in section, is a regular polygon or approxmate polygon with a centre of symmetry, and the internal surface of the intermediate device, when viewed in section, is a regular curved figure having a centre of symmetry, the two said centres of symmetry being coincident.

Conveniently, the receiver and the intermediate device are both elongate bodies, the said sections being taken transverse to the length of the elongate bodies.

Also conveniently the concentrator includes at least one mirror having, when viewed in section, cycloidal reflecting surface, the mirror being arranged generally opposite a side of the polygonal receiver.

Although it is preferred that the said arcs of the internal surface of the intermediate device, when viewed in section, are elliptical, in some arrangements the said curved arcs may be arcs of circles, for example the circles having the same radius, but different centres and the arcs approximating to arcs of ellipses. In other arrangements, the internal surface of the intermediate device may, when viewed in section, be a single circle.

However, it is preferred that the intermediate device is not circular in shape but is formed by e.g. six elliptical arcs. Each of the ellipses of which these arcs form part has its two focal points on the side of the polygon, e.g. a triangle, opposite the arc in question, approximately at the ends of the side. When these elliptical arcs are drawn, they almost coincide with the arcs of a circle.

Each ellipse concerned has two focal points. To express the segment which joins the two focal points of each of the ellipses, the terms "focal distance", "focal length" or "focal axis" may be used. It is preferred that the said focal distance coincides with the side of the polygon corresponding to the receiver.

From the point of view of construction, it may be more economical to substitute said elliptical arcs by the arcs of a circle, although the yield of the collector would be considerably inferior. Another development would be to substitute all these arcs of a circle by a single circle, the centre of which would coincide with that of the regular polygon forming the receiver. However, this device would reduce the thermic yield considerably more.

There will now be described a number of features of the preferred form of the present invention in its first aspect, in which the external perimeter of the receiver, seen in transverse section, is of polygonal form and will be surrounded by a device whose internal perimeter (seen in transverse section) is formed by elliptical arcs. This is arranged in this manner to take advantage of the property which the ellipse has that the rays which leave from its interior from its focal distance, upon being reflected thereat, return to internal points on the said focal distance.

In order to ensure that the rays which leave from the edges (the whole of the explanation will refer to the device viewed in transverse section) of the polygonal perimeter of the receiver, upon being reflected upon the elliptical arcs return to points of the said perimeter, these arcs are arranged between the extensions of the edges (of the above-mentioned perimeter) in such a manner that the focal distance of the said arcs shall be: (in the case of a convex polygon, that is to say that the external angles of its vertices shall be greater than 180 sexagesimal) (a) the respective edge for the arc in front thereof and comprised between the extensions of the two edges adjacent to that under consideration, (b) the straight line connecting the extreme points of two consecutive edges (diagonal for a polygon of more than three sides, or the opposite side for the case of three sides) for the elliptical arc comprised between the extensions of the two edges which are concurrent with the respective vertex.

In the case where the polygon is concave (that is to say with one or more external angles less than 180° sexagesimal), the extreme points of the two consecutive concurrent edges are joined, forming concave angles, there being obtained in this manner a convex polygon (by substituting the two edges which form the said angle by the connecting segment referred to above), and the problem is resolved by following the same rules as in the previous case.

In the particular case of a polygon of three sides, or more particularly of an equilateral triangle (which is the case which is selected as an example of a practical construction), the device is constituted by six elliptical arcs, three corresponding to case (a) and three corresponding to case (b) of a shape such that these arcs are equal three-to-three, which simplifies its manufacture. On the other hand, a triangle has been selected in order that the surface of emission of the receiver shall be the least possible.

In order to avoid losses of the rays which are reflected on the elliptical arcs, these are cut off at points without uneveness, that is to say the point of cutting of the extension of the edge, and of the two adjacent elliptical arcs all coincide at one poiont.

As the solar rays have been concentrated, they can pass to the receiver through openings formed in the device (formed by the elliptical arcs, seen in transverse section) in such a manner that by making the remainder of the internal surface of this latter reflective, the losses due to radiation from the receiver remain considerably reduced.

Applying what has been explained above to the practical case which is described hereinafter with reference to the drawings, the obtaining of the objectives set forth above is achieved by means of a collector which consists of a receiver, covered by a selective coating which supports high temperatures in vacuo (such as black chrome) and of which, seen in transverse section, its external perimeter is an equilateral triangle (with its upper edge horizontal) and the interior is a circumference (where the thermal fluid circulates). The plane horizontal external face corresponding to the upper edge of the said triangle receives directly a small part of the solar radiation and the remainder is concentrated by means of Fresnel lenses. The lateral external faces, corresponding to the edges of the triangle, receive the concentrated radiation from reflectors of parabolic section (in reality these have been substituted by cycloidal sections for reasons which will be explained in detail when considering a practical example of construction of the collector).

Said receiver is engaged between a device whose internal perimeter (seen in transverse section) is formed by six elliptical arcs, equal three to three, and each one of them is comprised between the extensions of the edges of the perimeter of the receiver. The focal distances of the said arcs of ellipse are: (a) the edge for the case of the arc in front of it and comprised between the extensions of the two edges adjacent to that under consideration, (b) the side opposite to the vertex, for the case of the elliptical arc comprised between the extensions of the edges which coincide with said vertex. The internal surface of the said device is reflective, except where corresponding to the openings which have been made in the same to permit the entry of the direct solar radiation to the receiver and the concentration by means of Fresnel lenses and cycloidal mirrors, said openings being closed by means of covers of transparent material (such as glass with a low content of oxides of iron in order that the index of absorption of the solar radiation shall be low).

This device has been introduced for the property, mentioned above, which is held by the ellipse, in that the rays which start from its focal distance, upon reflection at the ellipse return to internal points of the said focal distance, as a result of which it is obtained that, because the solar rays have been concentrated and pass through openings formed in the device, which seen in transverse section is formed by elliptical arcs, the greater part of the radiation emitted by the external faces of the receiver is reflected on the internal surface of the device and return to points of the said receiver, part of said rays being absorbed and part being reflected anew.

The losses which are found in the solar collector (apart from those of reflection and absorption of the solar radiation until it is absorbed by the receiver) are due to the radiant energy (emitted by the faces of the receiver by virtue of the temperature which it achieves) which escapes through the openings formed in the device, and also to convection and radiation from the external faces of the device, due to the heating produced by the absorption of the radiations emitted by the receiver, because the index of reflection is not one hundred percent and furthermore part of the rays which, after being reflected on the internal surface of the device, are not collected by the receiver, due to the deviation produced in the reflection by errors of shaping, mounting and lack of specularity of the reflecting surface.

In order to avoid convection, and minimise the losses by transmission between the receiver and the device, a vacuum is obtained in the space comprised between the two of them.

There will now be described a second main aspect of the present invention.

The first aspect as set out above was centred fundamentally on a device intended to be provided between the concentrators, whether these be reflectors or lenses, and the receiver, the device serving to reduce the losses of calorific energy due to the emission of radiant energy by the external surfaces of the receiver, particularly by virtue of the increased temperature of the same.

In order that such device should be able to carry out its task in a satisfactory manner, it was specified that the receiver be of a polygonal or approximately polygonal section, in the shape of a convex polygon or a concave polygon, such that by means of this construction and the determination of the internal perimeter of the said device on the basis of arcs of ellipse, comprised between the extensions of the perimeter of the receiver, it is obtained that the rays which start from within the focal distance of said ellipse, upon being reflected thereon, return to points within said focal distance so that, as the solar rays have been concentrated, by reflecting mirrors or lenses such as Fresnel, passing to the receiver through openings formed in the device, the losses due to the radiation from the receiver remain considerably reduced.

According to the present invention in a second main aspect there is provided a solar radiation collector comprising a receiver through which passes a medium to be heated by solar radiation, and a concentrator for concentrating solar radiation onto the receiver, characterised by an intermediate device between the concentrator and the receiver for reducing energy losses due to radiation emitted by the receiver, the intermediate device having a reflective, internal surface for reflecting back onto the receiver radiation emitted therefrom and having at least one window in its perimeter through which radiation is focussed onto the receiver by the concentrator, the external surface of the receiver, when viewed in section, having an approximately polygonal form but having at least one of its faces constituted by a curved concave surface.

Preferably the faces of the receiver are formed as curves, in such a manner that each curve substitutes for a plane side of a strict polygon, so that the end points of said curve rest approximately at the end points of the side of the said polygon, these curves determining a small concavity so as not to extend beyond the perimeter of the polygon.

Thus in preferred forms, the receiver, provided in the interior of an enclosure of reflecting sectors of curved section subjected to vacuum, with a general configuration of polygonal section and small number of sides, has a concavedly curved shape for at least one of its faces, determining that each ray, in its successive reflections on the receiver and enclosure, is shifted towards the central zone of the said face, avoiding its escape through the window of the enclosure and increasing the number of incidences on the receiver, with the consequent increase in yield of the collector so far as capturing of energy is concerned.

It is preferred that, starting from a polygonal section of the recciver, each concavedly curved sector of said receiver has its end points corresponding with the end points of the basic polygon, that is to say, with its vertices, and determining such curvature that the arcuate trace defined on each concavedly curved sector does not overlap the perimeter of the polygon.

There will now be set out a third main aspect of the present invention.

In accordance with the present invention in a third main aspect, there is provided a solar radiation collector comprising a recciver through which passes a medium to be heated by solar radiation, and a concentrator for concentrating solar radiation onto the receiver, characterised in that the concentrator includes at least one parabolic mirror for concentrating solar radiation and at least one plane mirror for reflecting the conccntrated radiation from the parabolic mirror onto the receiver, the plane mirror being moveable to positions closer to or farther from the receiver, while remaining parallel to its original position, in order to focus the concentrated solar radiation from the parabolic mirror onto the receiver.

Preferably there are provided radiation sensing means positioned at the edges of a window of an enclosure around the receiver through which passes solar radiation, the sensing means being arranged to sense mis-focussing of the solar radiation passing through the window, and there being provided means for moving the said plane mirrow automatically in response to mis focussing sensed by the sensing means, in such a manner as to correctly focus the radiation on the receiver.

Thus in a preferred form the second, plane, reflecting mirror, is enabled to displace itself parallel to itself in order to be placed nearer to or farther from the receiver and, consequently, to centre adequately the line of incidence of the rays on the said receiver, and it is arranged that on the lateral portions of each window of the enclosure of the receiver, through which pass the rays concentrated by the parabolic mirrors and reflected by the reflecting mirrors, there are disposed at least one pair of radiation sensors, such that each pair of sensors corresponds to each wedge of bundles of rays concentrated, for each system of double reflection, parabolic concentrator-plane reflector, it being provided that said sensors control the means of displacement for each plane mirror in order that this latter adopts automatically the most suitable position so that the wedge of rays is incident at all times on the receiver.

Thus advantages may be obtained by the disposition of a second, plane, reflecting mirror with the possibility of displacement parallel to itself, with which there collaborate radiation sensors disposed at the edges of the windows of the enclosure which surrounds the receiver.

With this it is possible to reduce the errors or deviations of the rays concentrated by the mirrors, with respect to their theoretical paths, which results in the possibility of using a receiver of lesser perimeter, to intercept the bundles of rays concentrated by the mirrors, in such a manner as to facilitate the obtaining of high temperatures of the transmitting medium to be heated by the collector, and at the same time permitting it to be maintained throughout the year, even for collectors with solar tracking about a single rotational axis.

More particularly, the luminous rays may be received and concentrated by each parabolic mirror, which are above a plane mirror displaceable parallel to itself and properly controlled by the abovementioned radiation sensors, in such a manner that the concentration is at any moment perfectly centred on the collector, no matter what the incidence of the radiation may be.

Embodiments of the invention will now be described by way of example with reference to the accompanying drawings in which.

Figure 1:
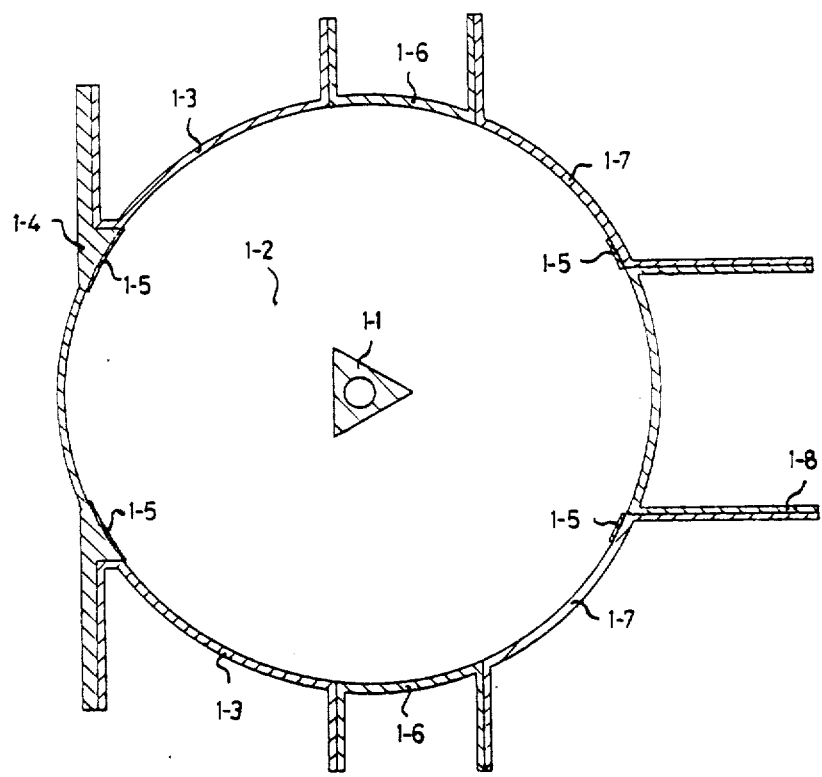
FIG. 1 shows an elevation of a transverse section of a receiver of a solar radiation collector embodying the invention in its first aspect, for clarity in the drawing there being shown only the parts corresponding to the plane of the section, the drawing being sbown approximately at a scale of 1/2.5.
Figure 2:
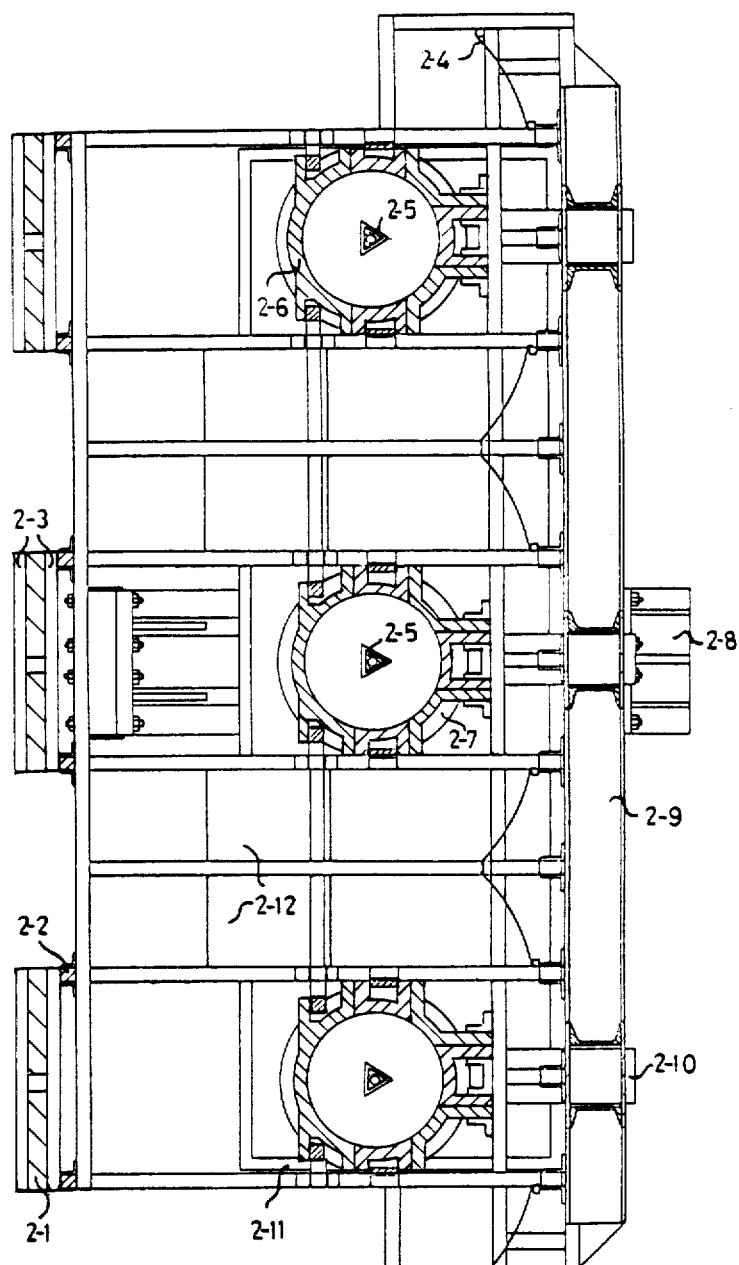
FIG. 2 shows an elevation of the transverse section of an assembly of three collectors embodying the invention on a metal structure, the drawing being shown to a scale of approximately 1/10.
Figure 3:
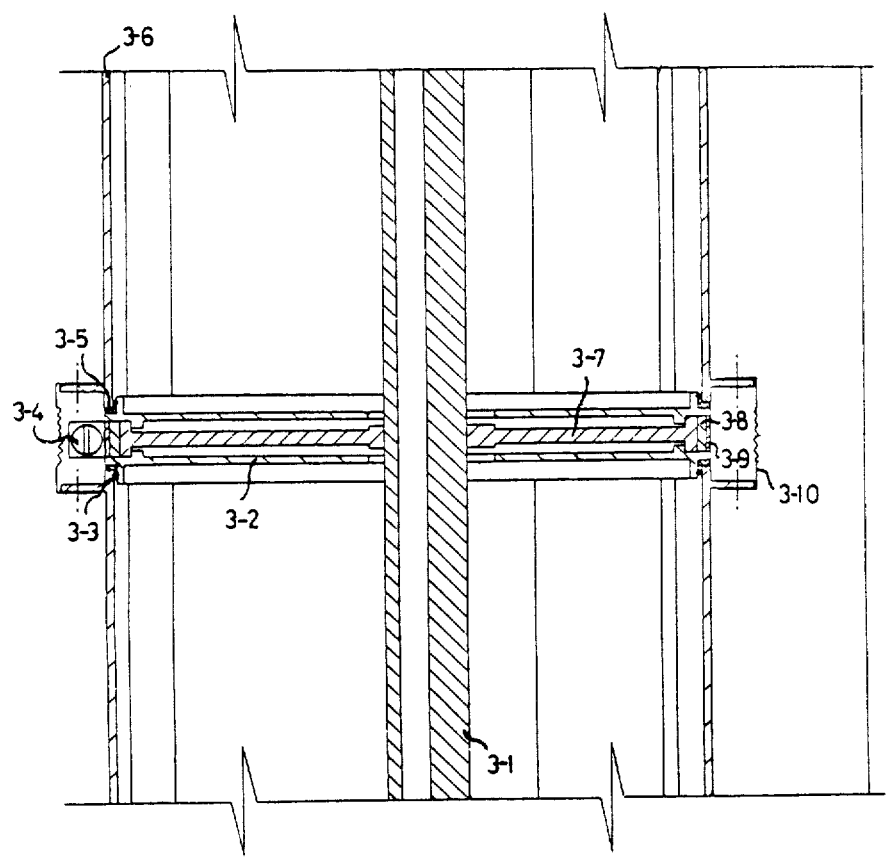
Figure 4:
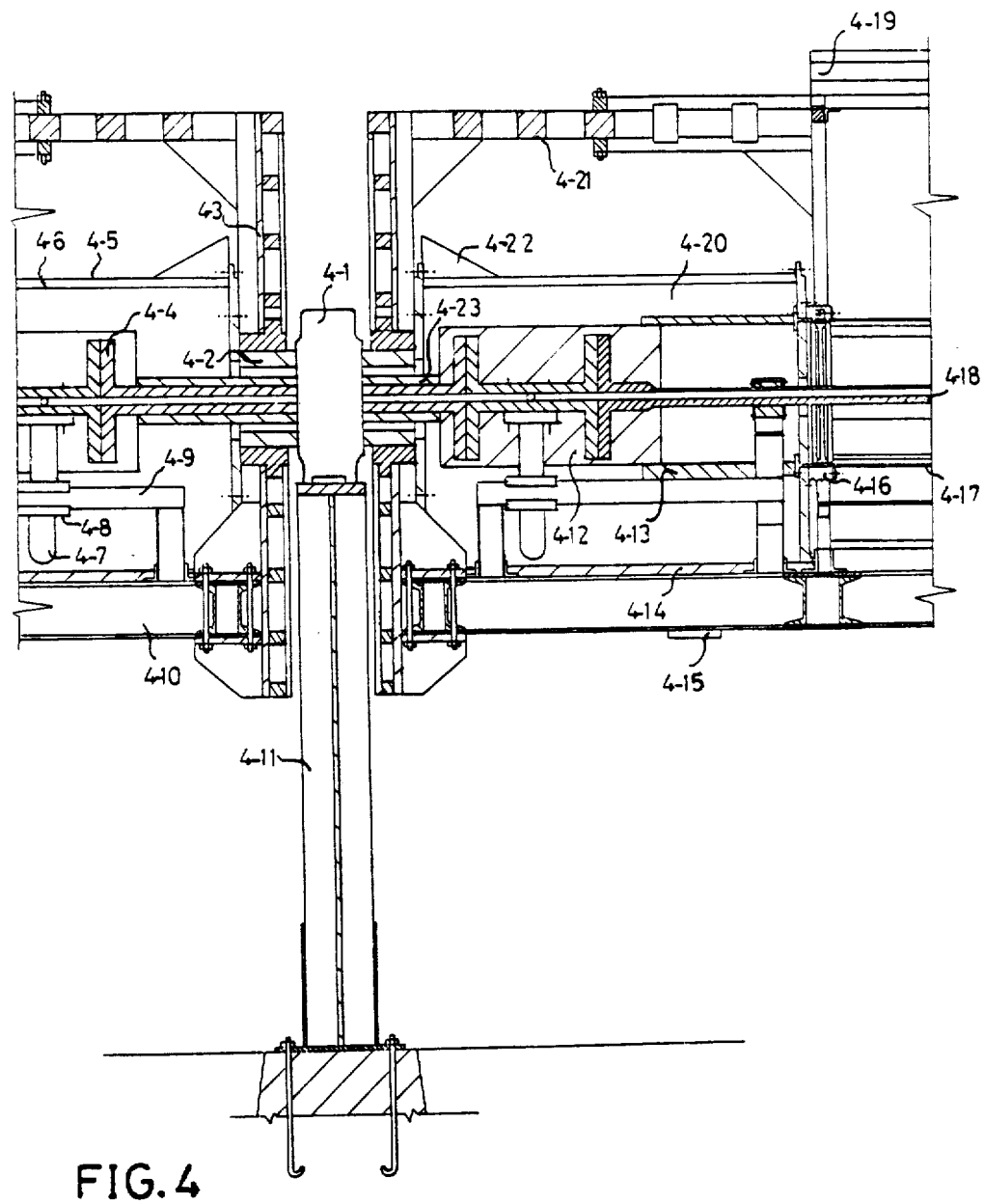
Figure 5:
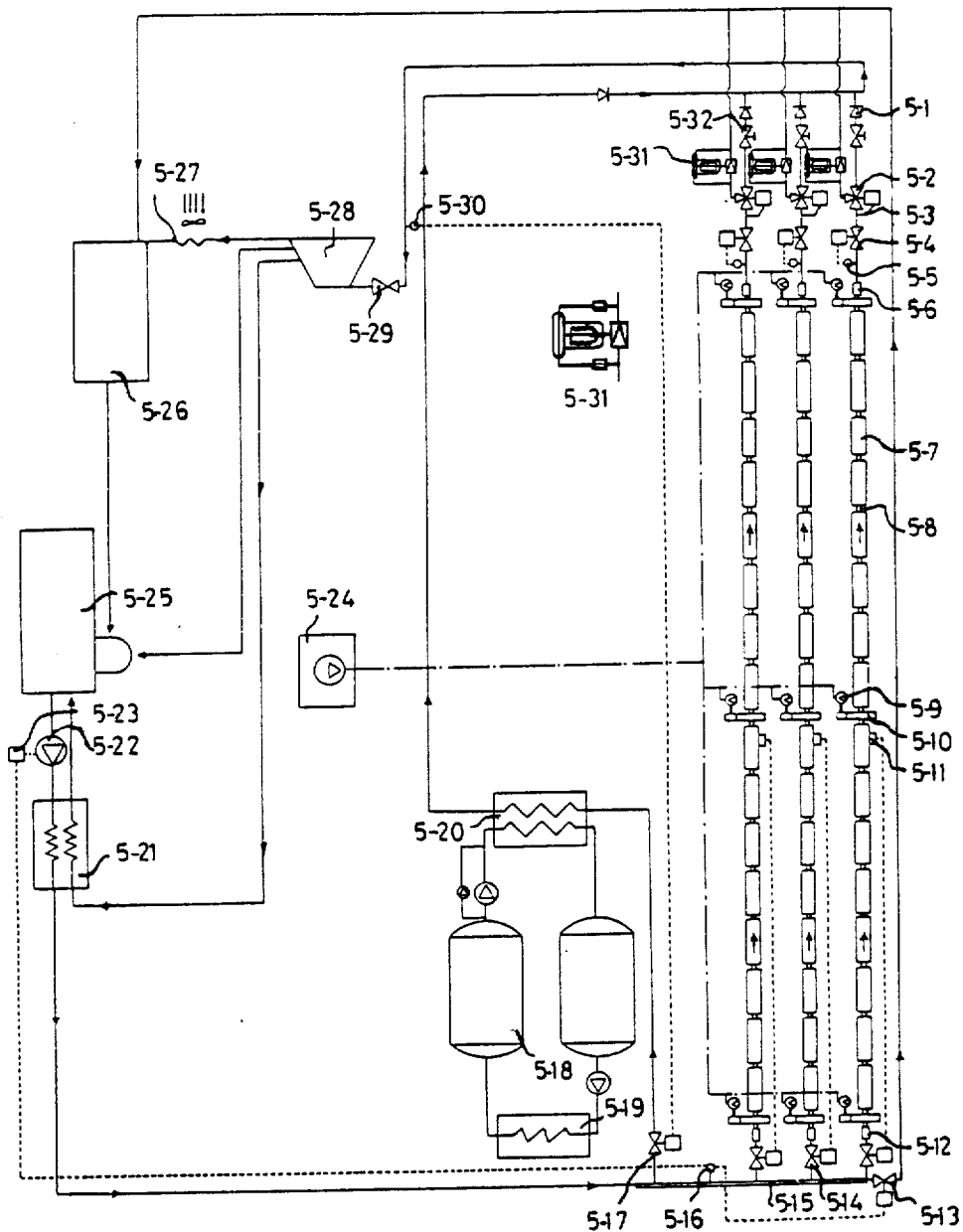
Figure 6:
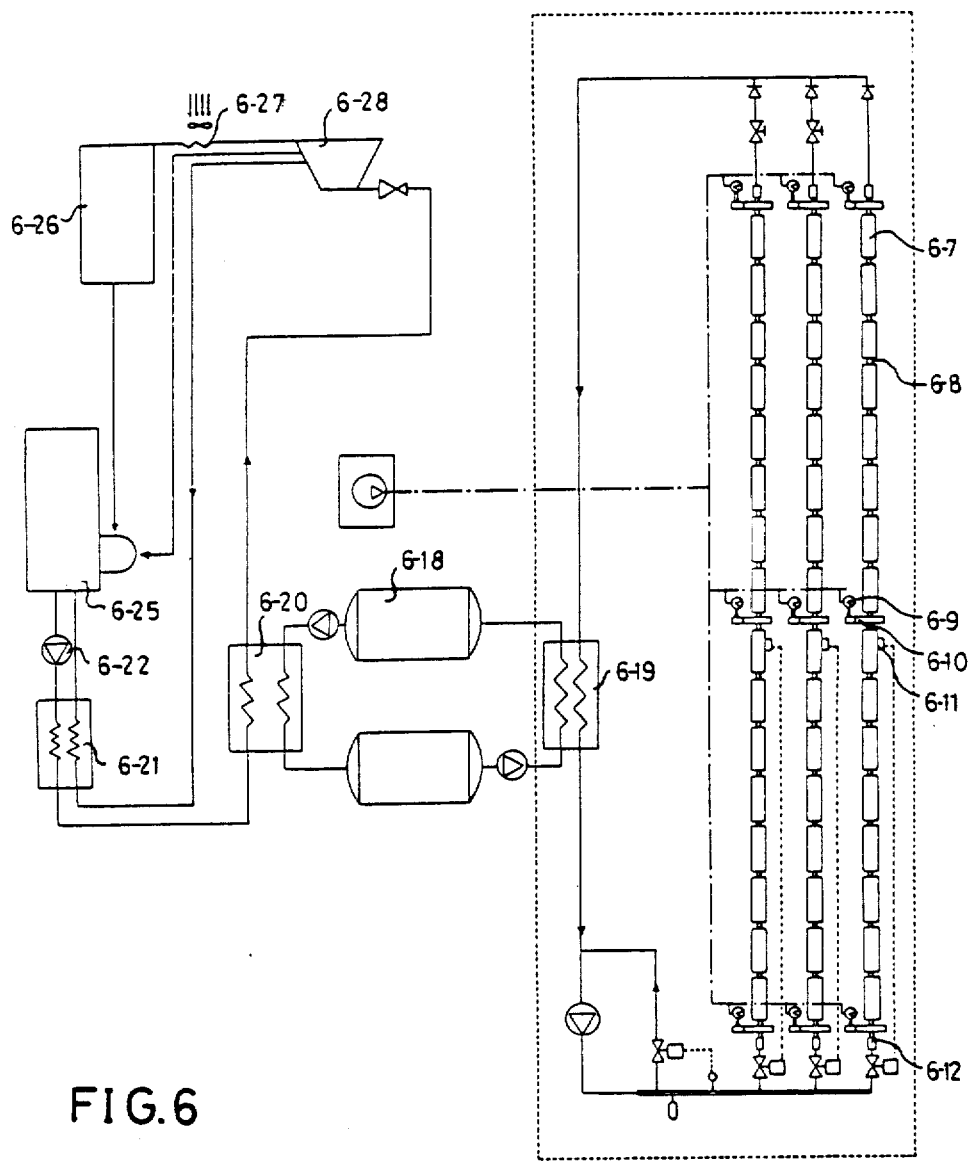
Figure 8:
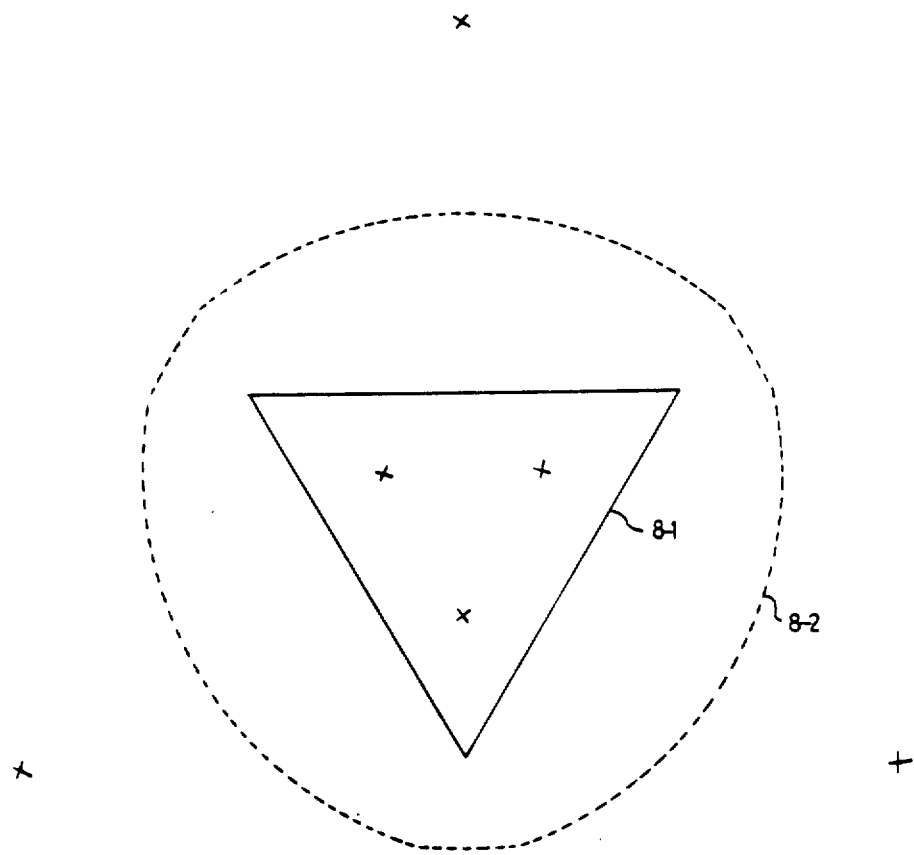
Figure 9:
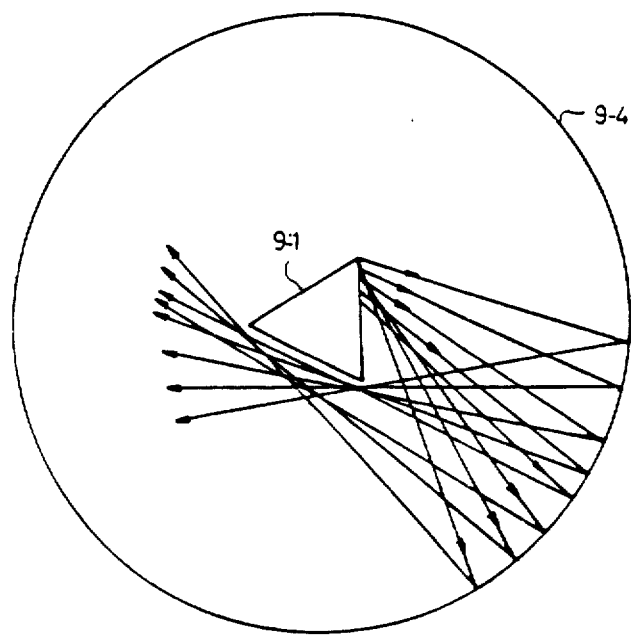
Figure 10:
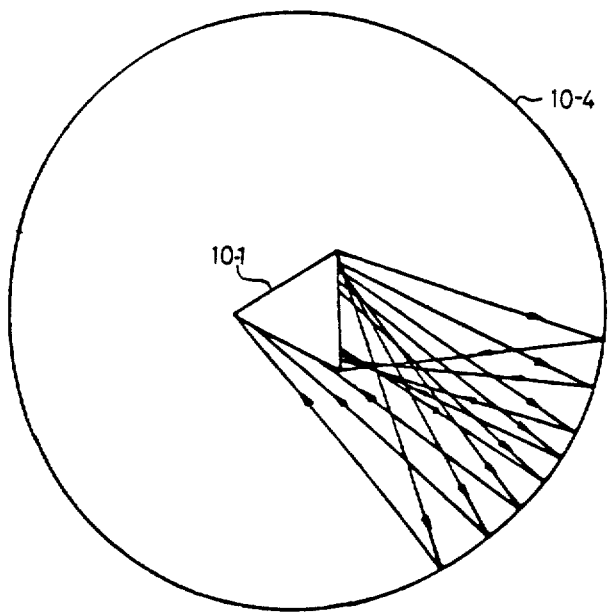
Figure 11:
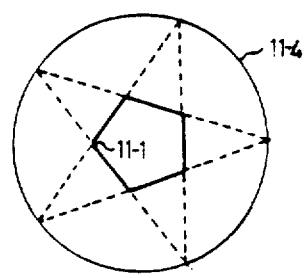
Figure 12:
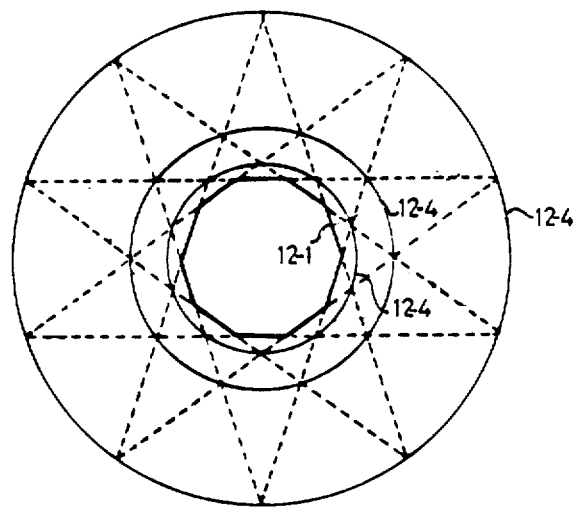
Figure 13:
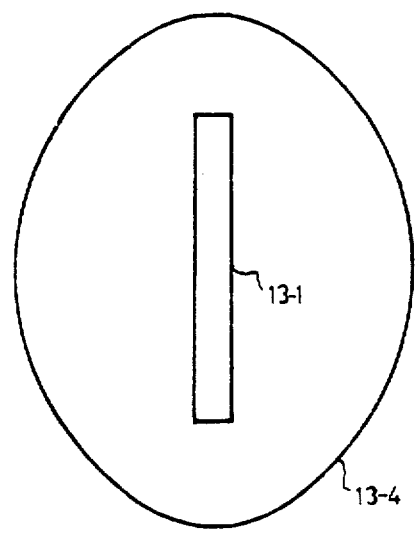
Figure 14:
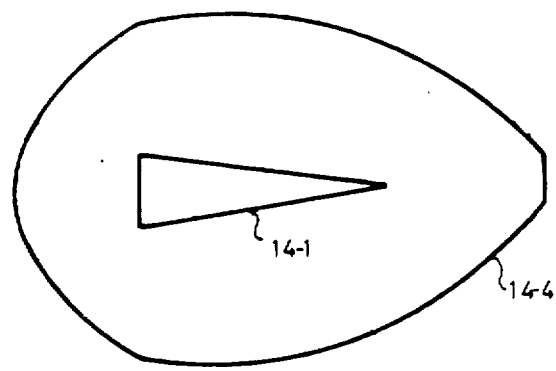
Figure 15:
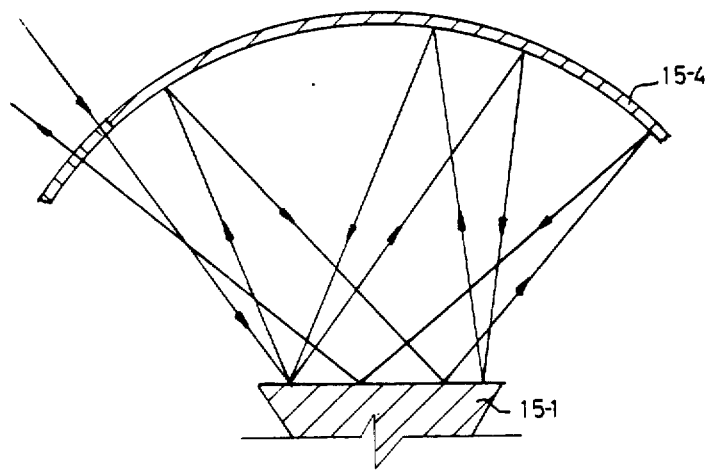
Figure 16:
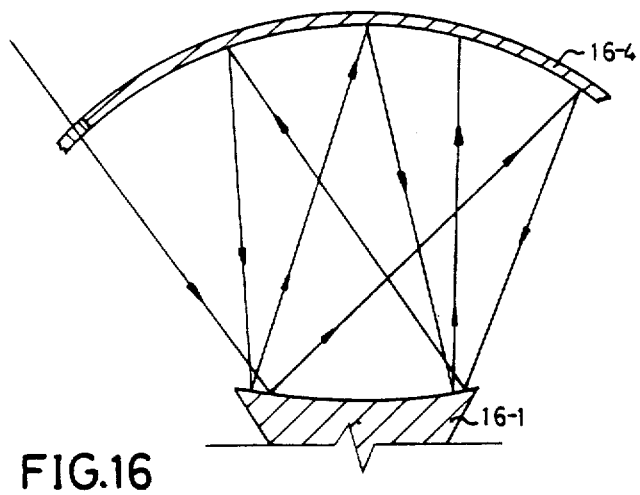
Figure 17:
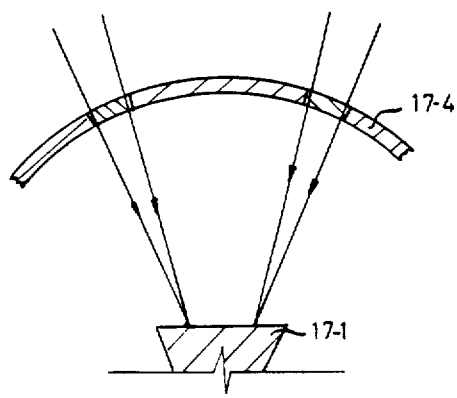
Figure 18:
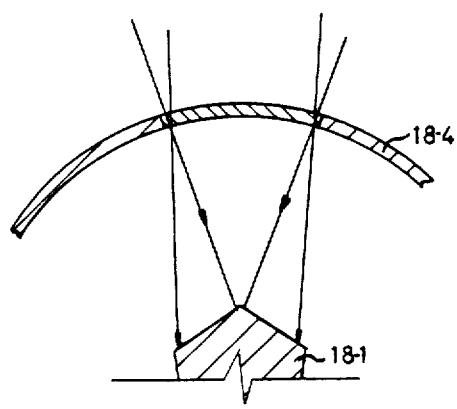
Figure 19:
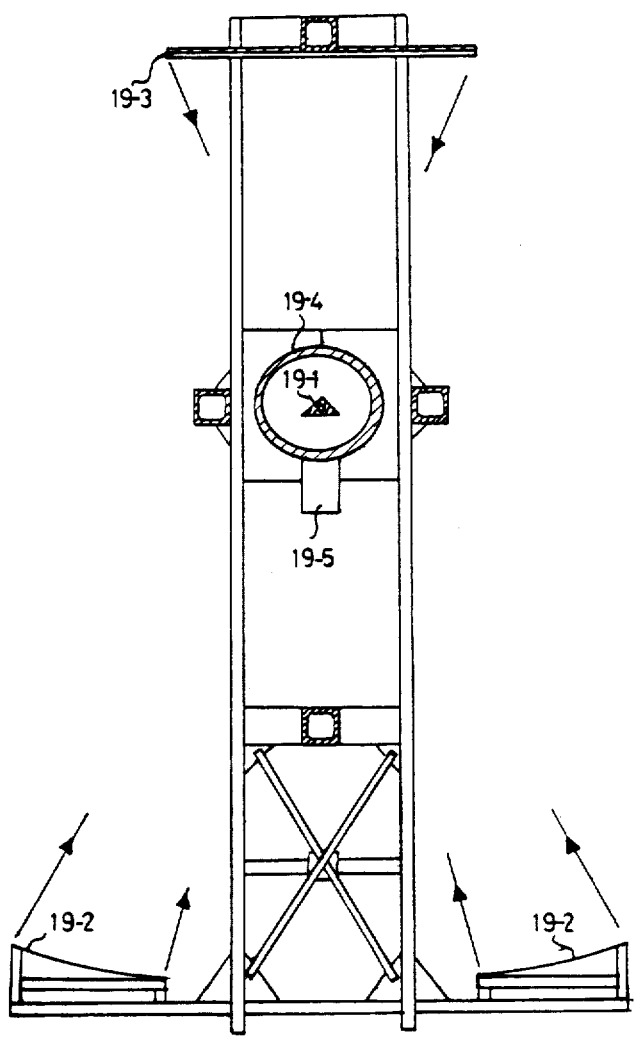
Figure 20:
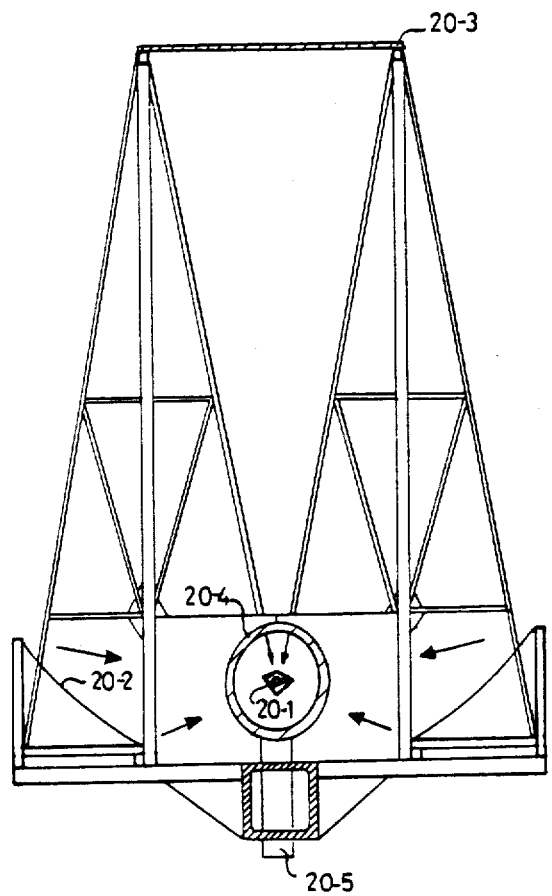
Figure 20A:
Figure 21:
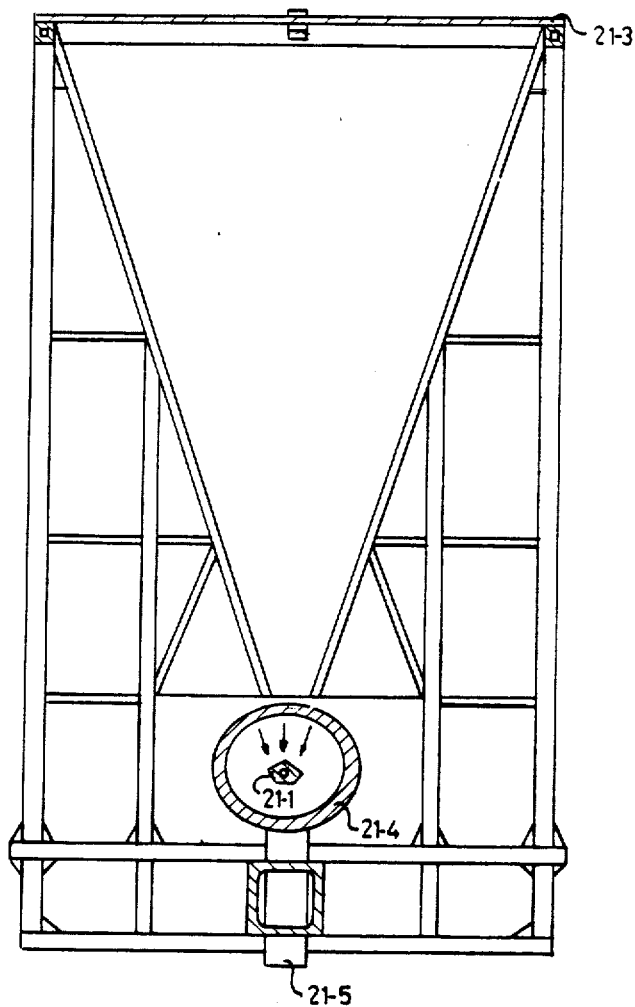
Figure 21A:
Figure 26:
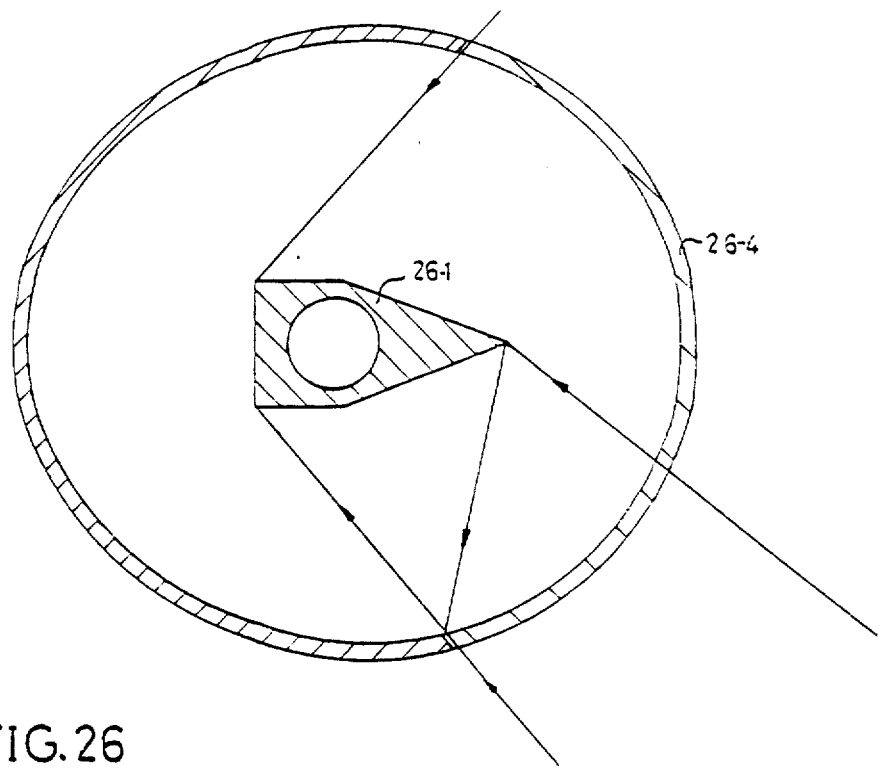
Figure 22:
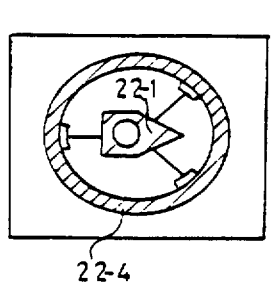
Figure 22:
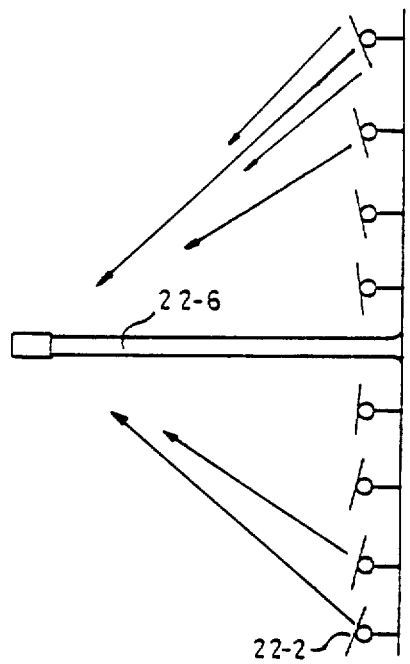
Figure 23:
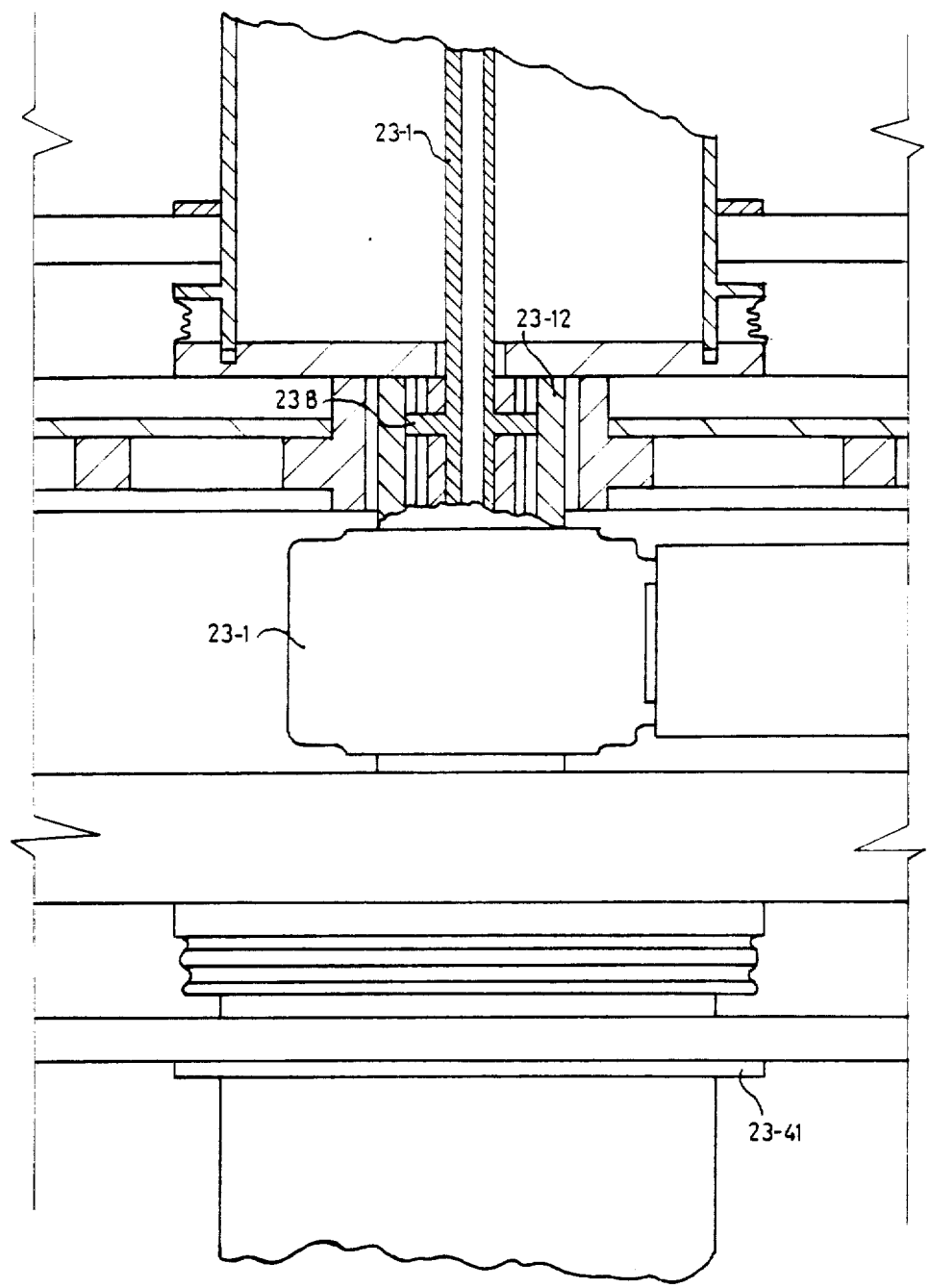
Figure 24:
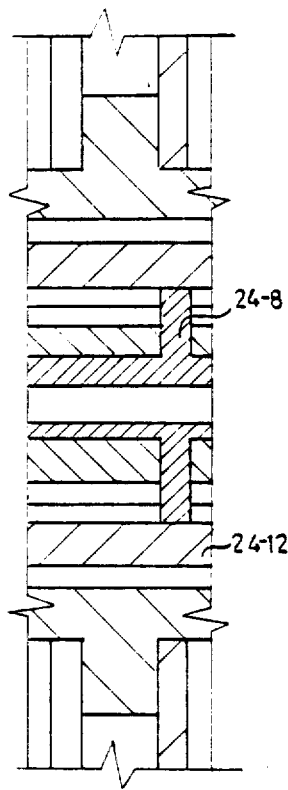
Figure 24:
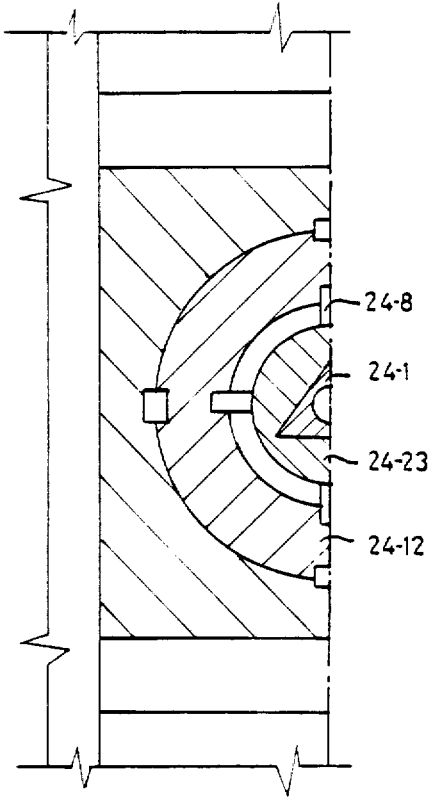
Figure 25:
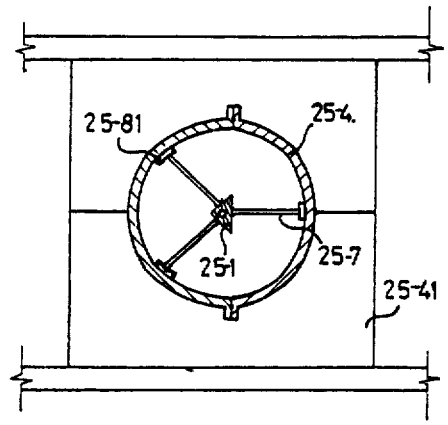
Figure 27:
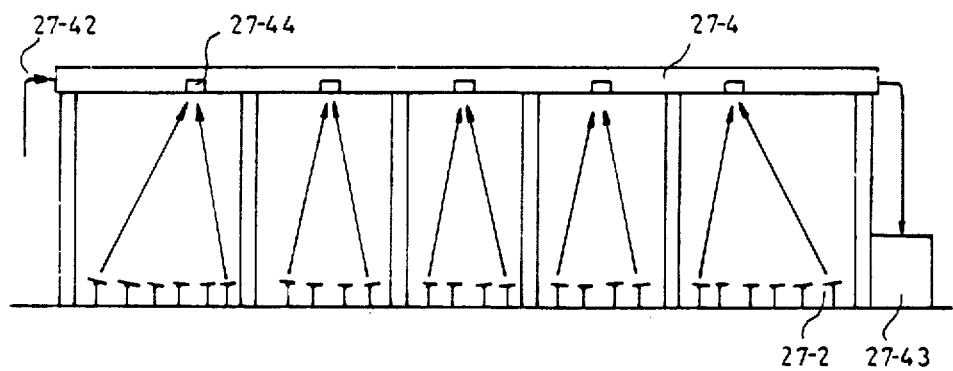
Figure 28:
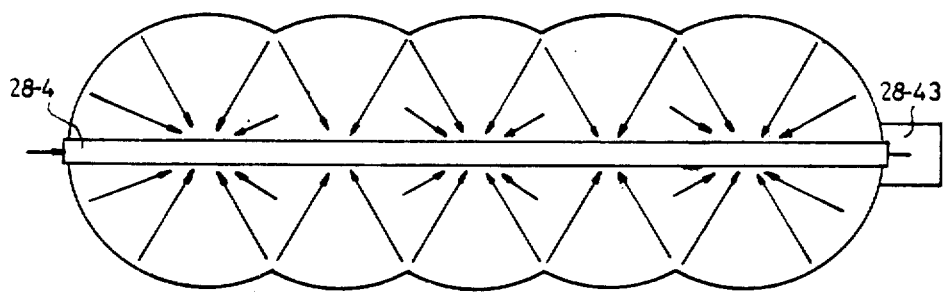
Figure 29:
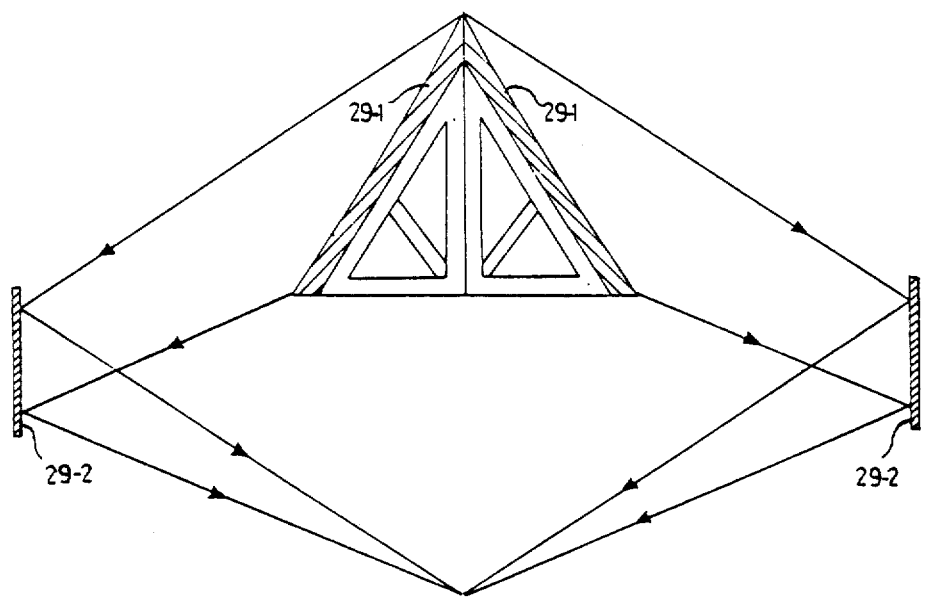
Figure 30:
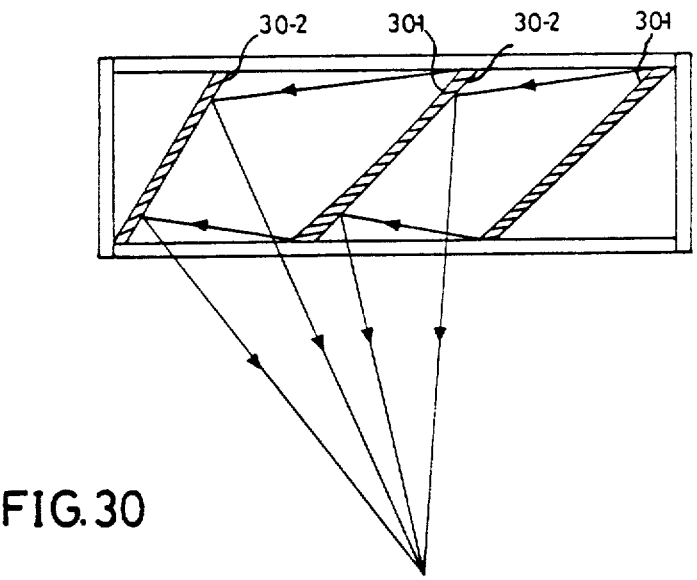
Figure 31:
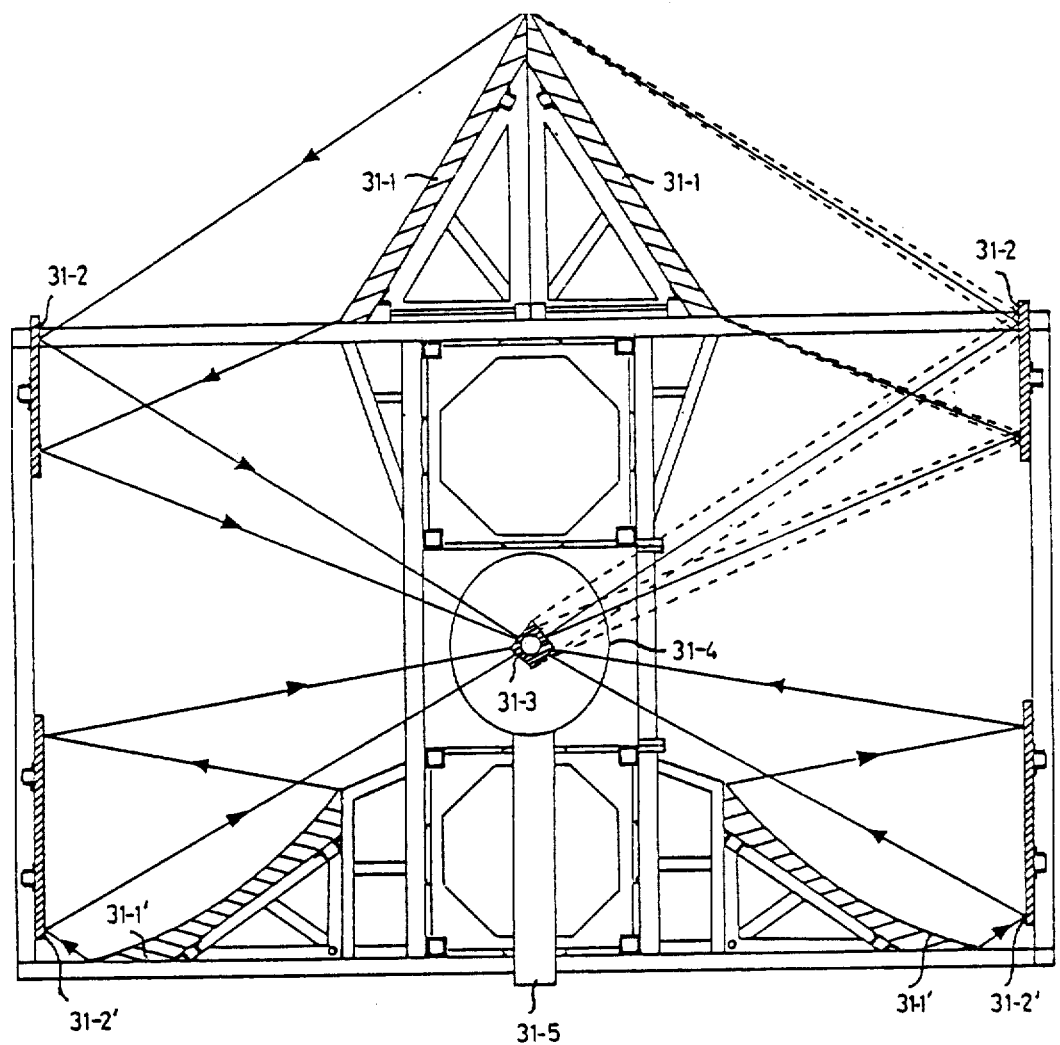
Figure 32:
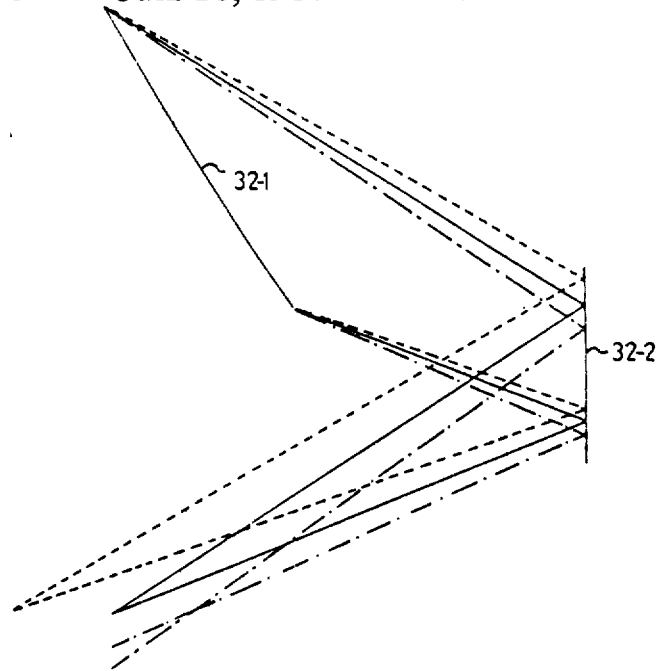
Figure 33:
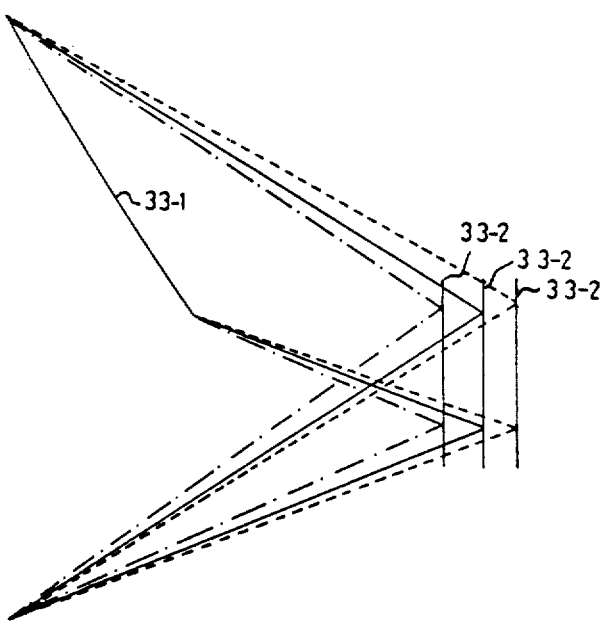
Figure 34:
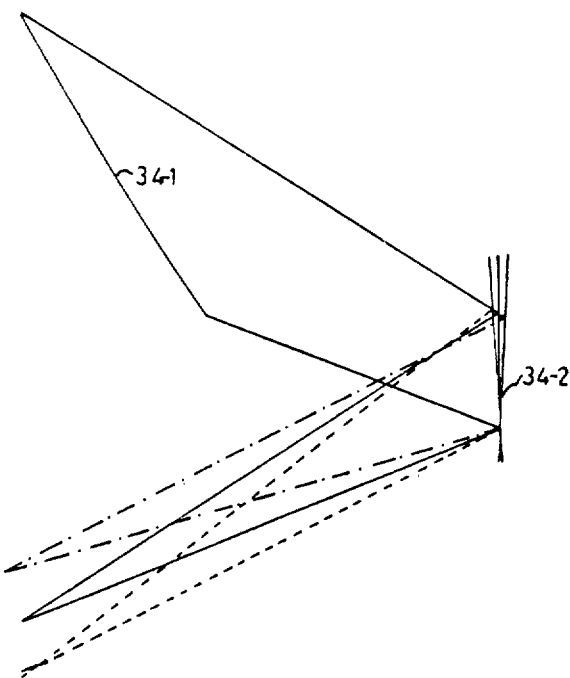
Figure 35:
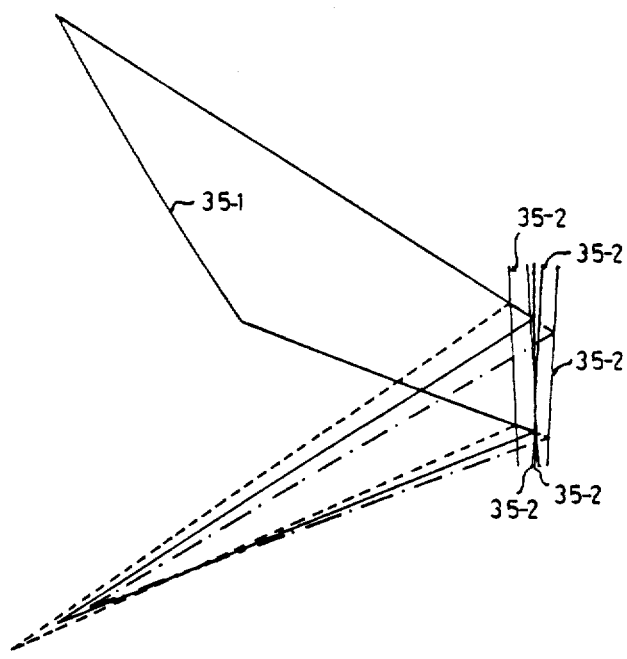
Figure 36:
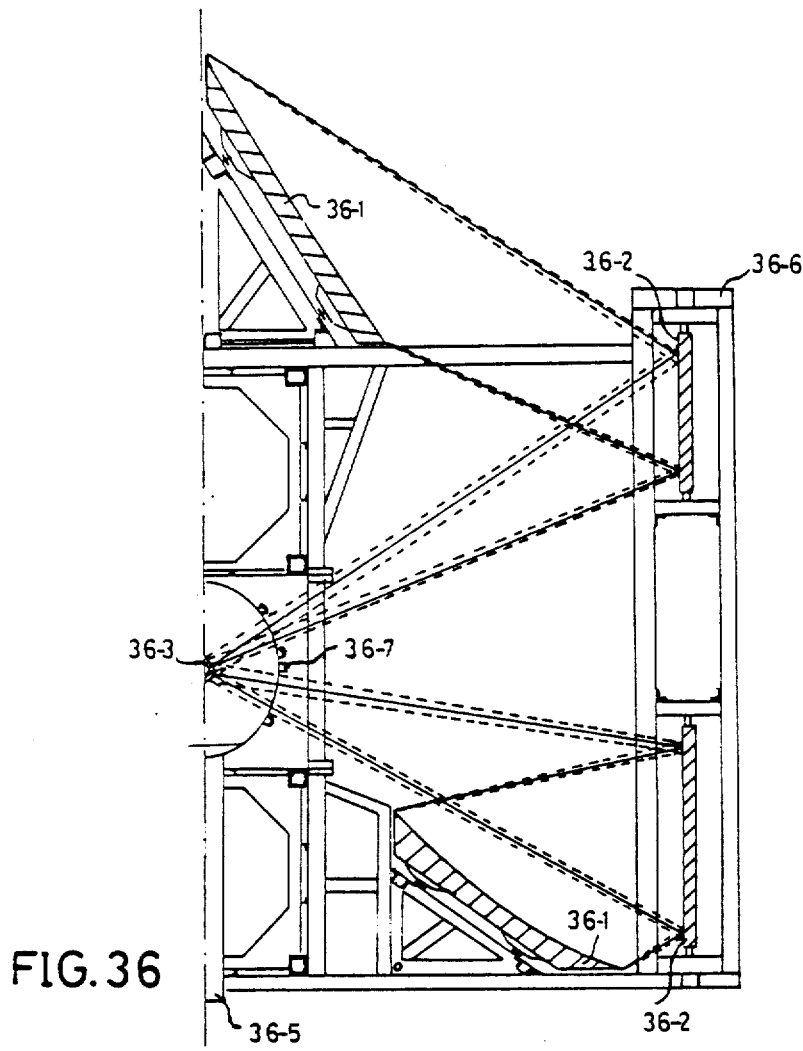
Figure 37:
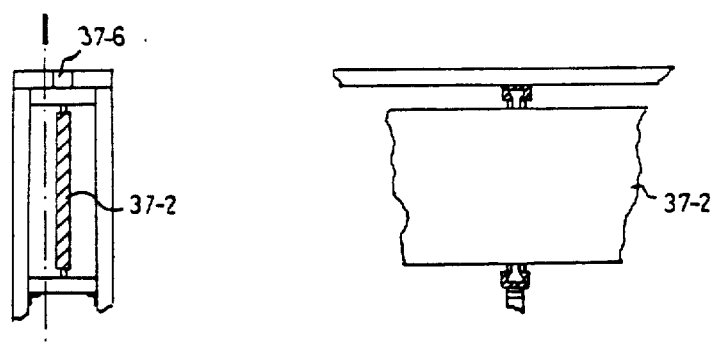

FIG. 3 shows an elevation of the longitudinal section of the receiver of FIGS. 1 and 2 encircled by an intermediate device according to the invention, there being shown one of the intermediate supports of the receiver as well as a system for maintaining at vacuum the union between the covers of the longitudinal sections into which the device is divided, said drawings being shown at a scale of approximately 1/2.5;

FIG. 4 shows an elevation of the longitudinal section of the system of connection between platforms which support the solar collectors, said drawings being shown at a scale of approximately 1/10;

FIGS. 5 and 6 show schematic views of possible forms of practical construction of an embodiment for use in transformation of thermal energy to electrical by the thermal fluid provided by a field of collectors;

FIG. 7A is an elevation of the transverse section of a storage depot and a system of insulation; FIG. 7B shows an elevation of the transverse section of the general conduction tubing and the insulation system, and FIG. 7C shows a schematic view of a possible arrangement of the field of collectors;

FIG. 8 shows an equilateral triangle encircled by elliptical arcs, showing the positioning of the centres of the circumferences, to approximate the arcs of ellipse by arcs of the latter;

FIGS. 9 and 10 show, respectively, an equilateral triangle surrounded by a concentric circumference and an equilateral triangle surrounded by the corresponding arcs of ellipse, in which there are shown rays which start from the perimeter of the triangle and are reflected at the circumference or at the elliptical arcs, respectively;

FIGS. 11 and 12 show respectively a regular pentagon and a regular decagon, surrounded by circumferences which pass through the apexes of joining of its edges;

FIGS. 13 and 14 show respectively two polygonal sections of a receiver surrounded by the correspondiong elliptical arcs;

FIG. 15 show the various reflections of a ray which enters through the window of an elliptical arc and is reflected on the edge of a receiver of polygonal section, as well as the elliptical arc;

FIG. 16 shows a case similar to that of the preceding figure but with the feature that the edge or side of the polygon has been substituted by a curve, with a small concavity, in accordance with the invention in its second aspect;

FIGS. 17 and 18 show the positions in which must be disposed the windows of the device or closure, with respect to an edge or vertex of the polygon, in order that the rays which enter through the window shall be absorbed by the receiver in successive impacts;

FIGS. 19 and 20 show respectively transverse sections of collectors with receivers of three and four sides, in a single module on a structure in place of various modules on a platform, as is shown in FIG. 2 hereinbefore;

FIG. 21 shows the transverse section of a collector, with polygonal receiver with five sides, with only concentrating refractory mirrors (Fresnel lenses) of a single module on a structure;

FIG. 22 shows a collector, in section, with polygonal receiver of five sides, surrounded by an enclosure, both remaining fixed with respect to the ground, with tracking of mirrors on two axes (heliostats);

FIG. 23 shows the connection between collectors, it being possible to see in the same how much it is reduced, in relation to that shown in FIG. 4 hereinbefore, upon turning to a single collector on a structure in place of a plurality;

FIGS. 24 and 25 correspond respectively to a detail and a section on the circle and the line of cut A—A of FIG. 23;

FIG. 26 shows an enlarged detail of the receiver, surrounded by the reflecting enclosure with windows of the collector in accordance with the representation of FIG. 22, FIG. 27 and 28 show longitudinal views corresponding to the collector with heliostats of FIG. 22, FIG. 29 shows a system of mirrors with double reflection by means of parabolic concentrating mirrors and mobile plane mirrors disposed in accordance with the third aspect of the invention;

FIG. 30 shows another system of mirrors with double reflection obtained in this case by means of plane mirrors;

FIG. 31 shows a schematic view in transverse section of a focal solar radiation collector constituted by a single module on a structure and systems of mirrors with double reflection using parabolic mirrors and plane mirrors, in accordance with the invention;

FIG. 32 shows schematically the deviations of the solar rays with respect to the theoretical paths of maximum advantage, due to errors produced by imperfect techniques;

FIG. 33 shows, likewise schematically, a manner of correcting said deviations by means of displacements of the mirror perpendicularly to its own plane and maintaining the situation of parallelism with respect to the same;

FIG. 34 shows schematically a construction similar to that of FIG. 32 in which there have been shown deviations of the rays due to errors in assembly, of the plane mirror, by installing it inclined with respect to its theoretical position;

FIG. 35 shows the manner of correcting the deviations of the previous figure by displacing the plane mirror parallel to itself;

FIG. 36 shows the lateral half of a collector similar to that of FIG. 31, whilst its other half is essentially symmetrical with respect thereto, in which collector there also appears a series of complementary elements such as adjusting elements for the parabolic mirrors, adjusting elements for the plane mirrors, and radiation sensor elements for control of the plane mirrors.

With reference to the drawings, and more particularly to FIG. 1, there is shown a receiver 1—1 which will be of steel (in view of the maximum temperature to be achieved by the receiver of 435° C. and as the pressure and tensions to which it will be subjected are small there will be many classes of steel suitable as material for the receiver). Its external faces are covered with a suitable coating of black chrome. This type of coating has been selected so as to permit obtaining it at low cost and so as to support high temperatures, and as there is provided a vacuum in its surroundings of approximately $10^{-5}$ millimetres of mercury column (or torr), it is protected from the effects of humidity. The deposits of black chrome usually contain 75% of metal and 25% of oxides, in view of the limit temperature of use, at atmospheric pressure, of 1000° C. The temperature to be reached by the thermal fluid (entry into the turbine) has been put at 400° C. because the surface temperature of the last section of the receiver has been estimated at 435° C.

In view of the possible existence of the inconvenience of degradation of the selected coating with time, there has been provided the possibility of the receiver for the purpose of restoring said coating by means of a new galvanic treatement.

At region 1-2 there is achieved a vacuum of approximately 10 torr in the space comprised between the receiver and the device.

The number 1-4 and 1-7 denote the pieces of glass, whose external and internal perimeters are circumferential arcs (as a substitution for those of an ellipse, for ease of construction) through which passes the concentrated solar radiation: (a) for the Fresnel lenses, in the case of piece 1-4, (b) for the cycloidal reflecting mirrors, in the case of pieces 1-7. The rest of the surfaces of the pieces 1-4, 1-7 (shown in heavy lines at 1-5) has been covered, at the internal part, with reflecting material which can be aluminium applied by vaporisation in vacuo. The internal perimeters of the pieces 1-4, 1-4, 1-6, 1-7 and 1-8 are circumferential arcs in substitution for those of an ellipse. This has been achieved in this manner for ease of construction and finishing of the internal surfaces of the said pieces. By substitution of the elliptical arcs with circumferential arcs there are some errors of form, as a result of which a percentage of the rays which are reflected at the interior surface of the device are lost and are not collected by the receiver. This percentage can be estimated at five per cent. The pieces marked with the numerals 1-3, 1-6 and 1-8 will be constructed with a coating of aluminium. Their process of manufacture is obtained by: (1) pressing, (2) emery polishing of the internal surface to diminish the errors of shaping of the first operation, (3) fine emery polishing (or lapping) of the internal surface for the purpose of increasing the degree of reflection (incident polar angle equal to the reflected polar angle).

In the connections between the pieces of the device there will be installed joints for the purpose of maintaining the vacuum. This has not been shown, for simplication of the drawing.

With reference to the FIG. 2 which shows the elevation of the transverse section of an assembly of three solar collectors on a metallic structure, component 2-1 is a Fresnel lenses (plane at the upper part for the purpose of preserving them from soiling) which can be constructed of plastics or of glass. The lenses are supported by rectangular frames of steel 2-2 with glass cross-members 2-3.

Reference 2-4 indicates concentrating reflecting mirrors in which the parabolic section has been substituted by a cycloidal section. This has been carried out in this manner for two reasons: (1) for the purpose of retaining easy mechanisation and a perfect finish of the reflecting surfaces, (2) to retain a perimeter of the receiver (seen in transverse section) of less length as a result of which its emitted energy will be less.

With respect to reason (1) given above, the process of mechanisation consists of: (a) pressing, (b) polishing with emery for the purpose of eliminating the errors of shaping of the previous operation, (c) fine polishing with emery, or laping, to increase the mirror reflection, (d) plating with silver by vaporisation in vacuo for the purpose of increasing the reflectance, (e) a protective covering by vaporisation at high vacuum of borosilicate glass and silicon oxide for the purpose of avoiding the change of colour or darkening of the vaporised silver coating which is exposed to atmospheric influences and above all to avoid abrasion due to handling.

The substitution of the parabolic section by a cycloidal section permits easy mechanisation of the operations (b) and (c) and a perfect finish of the external surface of the pieces, because an emery polishing machine which describes a cycloid in its advancing movement is easily constructed.

So far as concerns the retention of a perimeter of the receiver (seen in transverse section) of less length, this is based on the fact that the number of sides shall be the least possible, for example a triangle. In order to retain, amongst the triangles possible, that with the smallest side, the perimeter is calculated to fulfil the following: (a) an axis of symmetry of the triangle coincides with the axis of symmetry of the parabola being considered, the focus being an internal point of the triangle (in the case of being equilateral, it coincides with the centre thereof); (b) once the above has been achieved, the side is calculated in a manner which ensures that the ray reflected at the point most distant from the parabolic section to the focus, and which passes through this latter, shall be a bisector of the angle formed by the rays which pass from said most distant point to the ends of the side under consideration (in the case where the perimeter is an equilateral triangle the central ray cuts the side under consideration perpendicularly in such a manner that the point of cutting divides the edge in two equal parts). With this, it is ensured that the side shall be minimum, since the errors of: mounting, tracking form and dispersion of the rays by reason of lack of specularity of the reflecting surfaces, statistically divide themselves symmetrically with respect to the ray (without deviation) which passes through the focus.

The perimeter is calculated in such a manner as to obtain that the reflected ray at the point most distant from the parabolic section to the focus, and which passes therethrough, shall be a bisector of the angle formed by the rays which pass from said most distant point to the ends of the side in question (because the perimeter is an equilateral triangle the central ray cuts the said side perpendicularly in such a manner that the point of cutting divides the edge into two equal parts). By this means it is ensured that the side is minimum although the angles, due to errors of mounting, solar tracking, shape and dispersion of the rays by reason of lack of specularity of the reflecting surface, statistically divide themselves symmetrically with respect to the ray (without deviation) which passes through the focus.

For the remainder of the points of the parabola, it is not achieved that the rays which pass from said points to the focus are bisectors of the angles formed at said points and comprised by the straight lines between them and the two ends of the said side of the perimeter of the receiver (seen in transverse section). Due to this lack of symmetry in the dividing of the angles by the straight lines which go from the points of the parabola to the focus, part of the deviated rays with respect to these straight lines (as a consequence of the errors cited above) do not cut points of the perimeter of the receiver, and are thus lost. (Because the segments subtended between the straight lines which form an angle are smaller, to the extent that the distance from the vertex to said segment diminishes, this does not compensate for all that has been said in the previous case).

In order that all of the solar rays reflected at points of the mirror, and deviated (due to the errors) in such a manner as not to pass through the focus, shall be collected by the receiver, the parabolic arcs are substituted by cycloidal arcs in such a manner that the theoretical rays reflected at points of this last curve come closer to being the bisector of the angles formed by the straight lines which connect the points of the cycloid and the ends of the said side of the perimeter of the receiver (seen in transverse section). To achieve the foregoing, the cycloid is selected in such a manner that its axis of symmetry (parallel to the Y of the equation of the cycloid) passes through the point of the arc of the parabola most distant from the focus and its direction coincides with the straight line bisector of the angle formed between the incident ray and the reflected ray at the said point of the parabola. Furthermore, making this last point coincide with that of the cycloid for 180 sexagesimal degrees gives the equation of this curve:

$$X = R(\phi - \sin\phi)$$

$$Y = R(1 - \cos\phi)$$

so that the slopes of both curves coincide at the said point.

The radius of said cycloidal arc will depend upon the parabola and the triangle selected, as well as the extent of the errors mentioned above, such that the rays which are deviated and which do not pass through the focus will be incident upon points of the triangle (or a large percentage of them).

For the case shown in FIG. 2 there is taken the parabola X = 190.52 and for some rectangular cartesian axes displaced with respect to other parallels whose coordinate origin is the centre of the equilateral triangle (external perimeter of the receiver seen in transverse section) and whose abscissa axis or X axis is parallel to the lower margin of the sheet on which this drawing is placed. These displacements are: x=0 and y=47,631 centimetres (real size δ 4,763 centimetres in the plane) from the lower margin of the sheet.

The parabolic arc is comprised between the coordinates X = ±30 centimetres and X = ±55 centimetres (real size) which gives some ordinates Y = 4,723 centimetres and Y = 15,877 centimetres respectively; said parabolic arc has been substituted by another of cycloid shape of radius 308 millemetres between φ = 180 sexagesimal degrees and φ = 154,35 sexagesimal degrees (its equation and its axes being those defined earlier) installed between the points: X = ±30 centimetres, Y = 4,995 centimeters; X = ±55 centimetres, Y = 15,877 centimetres (said coordinates are referred to the same cartesian axes taken for the representation of the parabola).

In FIG. 2 the reference 2-5 indicates the receiver. The reference 2-6 indicates an intermediate device embodying the invention in its first aspect. There can also be seen the members for the support and fixing to the structure. Reference 2-7 indicates the lateral covers of the device which finally collect the oblique rays. Reference 2-8 indicates the connecting member between the structure and the hollow shaft (shown at 4-2 in FIG. 4) which is introduced into the ball bearing shown at 4-1 in FIG. 4. Reference 2-9 indicates the metallic support structure of the solar collectors. Reference 2-10 indicates the connecting conduits of the vacuum assembly in order to be able to retain the approximate $10^{-5}$ torr necessary to avoid losses by convection and transmission from the receiver. Reference 2-11 indicates the fastening corresponding to 4-14 in FIG. 4. Reference 2-12 indicates the mirrors (corresponding to reference 4-22 in FIG. 4 for the purpose of collecting part of the rays which strike above the sections set apart for expansion. (They have been shown for an inclination corresponding to the period March-December-September, for the remainder they will be better suited with a major inclination).

The screws for fastening of the members (excepting member 2-8) and for connection between fastenings have not been shown, in order not to complicate the drawing. All of the assembly of collectors and structure has been calculated in such a manner that the centre of gravity coincides with the centre of rotation (in reality the whole of the structure has been calculated up to the thrust bearings) in order that the torque to be overcome by the rotary hydraulic actuator (which could be a vane) of the follower system shall be minimal, as well as for avoiding that it remains under load in the periods of time which remain without actuation or in any case to use a small retaining ratchet.

The receiver has been calculated in such a manner that, considering a deviation of the solar rays of 2.75 sexagesimal degrees (in each sense of direction) with respect to a theoretical ray (with which there is achieved the fact that the solar disc seen from the earth shall be punctual, and that no errors shall exist: of shape in the cycloidal mirrors and the Fesnel lenses, mounting, tracking and dispersion of the rays and the reflection, by reason of lack of specularity of the reflecting surfaces) its directions will cut points of the perimeter of the said receiver. From the 2.75 degrees (sexagesimal) of deviation, the error of tracking could be considered as 45 minutes (sexagesimal) so that the hydraulic actuator would operate each three minutes of time, the actuation being already obtained with radiation sensors, or passively by preprogrammed microprocessor.

This assembly of three modules has been selected for constructional reasons and because the height of the centre of rotation or the centre of the bearings from the earth is a reasonable quantity. Because the assembly has to rotate in order to remain "face-downward" in the following cases: (a) in order to remain covered at times when external influences could damage the collector (such as hail), (b) in order to remain in said position at periods of non-operation (as during the night) and in this manner avoid the soiling which would be produced by the deposition of particles resulting from atmospheric contamination, (c) to avoid high temperatures of the receiver in the case of interruption of the flow of the thermal fluid which circulates through its interior, which would give rise to large expansions.

FIG. 3 shows the elevation of the longitudinal section of the receiver 3-1 surrounded by the device 3-6. In it there can be seen one of the intermediate supports 3-7 of the receiver as well as the device for placing under vacuum, reference numbers 3-3, 3-4, 3-5, 3-8, 3-9, and 3-10, in the connection between the covers 3-2 of the longitudinal sections into which the device is divided.

These intermediate supports have been introduced in order to avoid the flexing which would be obtained if the receiver were supported solely at its end (for great lengths of the receiver). Without them, such flexing would give rise to errors which would add to those of construction (tolerances in the members, measurements, and mechanics of the assembly).

At the time of installation of these supports 3-7 it has consequently been necessary to provide the covers 3-2 in order to catch the oblique rays (from the sun and from the receiver).

These covers will be of aluminium in order to reflect the said radiation.

By tightening the screw 3-4 of the bracket 3-9, this presses the resilient ring 3-8 which in its turn pushes the covers 3-2 against the rings (likewise resilient) 3-5, in such a manner that the receiver remains coupled to the device. This coupling has been made in this manner in order to absorb the expansion of the device.

The front members, apart from coupling of the receiver, have together with the resilient rings in the covers 3-3 the function of a first vacuum seal. The members 3-10 have as their function a second vacuum seal.

FIG. 4 shows the elevation of the longitudinal section of the system of connection between the platforms which support the collectors.

In order to be able to obtain a field of collectors of large dimensions with the least possible number of metres of general flow tubing (schematic drawings FIGS. 5, 6 and 7) the heating of the thermal fluid is obtained in a long length of collector, for which reason it has been necessary for constructive purposes) to divide it into various longitudinal sections with intermediate supports in order that the supporting platforms have a relatively small loading and in this way permit an economic dimensioning of the structure for flexings which can be disregarded in practice. Therefore, said total length has been divided into various sections formed by platforms (which support three collectors as shown in the FIG. 2 which are supported in bearings 4-1 in which have been made ball bearings in order that the friction shall be low and in this way the hydraulic motor which provides the solar tracking movement shall be at low power, and also in order that the errors due to torsion of the structure shall be ignorable.

In order to permit the demounting of the bearings, where is provided member 4-9 formed as stirrups (it is to be assumed that it would be necessary to cut them in the case of changing of the bearings). In the interior of the bearing there is placed the hollow shaft 4-2 and above it there is hung the structure 4-10 which is coupled to it by means of the removable connecting member 4-3. At the interior of the hollow shaft 4-2 there is introduced the tubing through which the thermal fluid flows, permitting the expansion of this connection. In the drawing there is shown the receiver 4-18 without expansion, because the interior spaces have been left for the insulations 4-13 in order to permit that the insulations 4-12 nre not interfered with in their movement of translation, upon longitudinal expansion of the connection. This has been constructed in this manner because use has been made of normal stirrups, and if it is desired to reduce the space provided for expansion, the hollow shaft would have to have an internal diameter which was very large in order to permit the sliding, in its interior, of the portion of the conduit with stirrups, which would give rise to very large ball bearings which would considerably increase the cost of the project.

Reference 4-5 represents a seal of glass (or plastics). Reference 4-6 represents a seal of aluminium with optional external cover.

The function of these two members is to collect the solar radiation and due to the "winter effect" the temperature of member 4-6 would be high in order to diminish the losses by radiation of the external surfaces of the insulation, members 4-12, 4-13, 4-23, as well as that of the sealing surfaces 4-14 because the radiation emitted by member 4-6 heats the latter. Reference 4-7 represents the member for absorbing the expansions of the connecting conduit between the receivers. References 4-8 and 4-9 show the sliding support for the receiver. Reference 4-11 shows the support beam (where there is installed the bearings housing 4-1) with the anchoring means. Reference 4-15 shows the vacuum conduit whose function is the same as explained for component 2-10 of the drawing of FIG. 2. Reference 4-16 shows the system of holding under vacuum explained in the drawing of sheet 3. Reference 4-17 shows the said intermediate device. Reference 4-19 shows the Fresnel lenses. Reference 4-20 indicates a region having a vacuum of approximately $10^{-5}$ torr. Reference 4-21 shows the members whose function is that of a counterweight in order that the centre of gravity shall conincide with the centre of rotation. Reference 4-22 shows the mirrors whose function is explained in FIG. 2, at member 2-12. The insulations, members 4-12, 4-13 and 4-22 are covered with a layer of aluminium in order to reduce radiation. The interior of the seal 4-14 will likewise be of reflective material (coating of aluminium) in order to reduce losses by radiation.

The drawings of FIGS. 5 and 6 show schematics of possible forms of obtaining in practice utilisation (transformation of thermal energy to electrical energy) of the thermal fluid produced by a field of collectors in order to make a calculation which gives an idea of the saving of energy achieved.

FIG. 5 shows a schematic of the whole of the functioning and coupling of three lines of solar collectors to a thermal centre for conversion of energy. Only three lines have been shown, because this is considered to be sufficient for the understanding of the functional schematic. In FIG. 7C there is shown a schematic of an assembly of lines for a 5 MW centre (five mega-watts of power, average).

In the system for the conversaion of energy, the schematic of which is shown in the FIG. 5, the thermal fluid heated in the collectors goes directly to the turbine, so that there is obtained the process of evaporation and subsequent re-heating in the receiver of said collectors, with the result that there is elimination of the steam generator which, with the storage diffuser and a second thermal fluid, forms the system which is normally used at present. This system is considered achievable because the causes adduced for not achicving it in this way are: (a) instability of control: (1)in the pressure and temperature of the thermal fluid, which have to be maintained at design conditions; (2) in the flow of thermal fluid to be sent to the turbine; (b) the instabilities of control can give rise to the possibility of high temperatures of the fluid and its possible decomposition; (c) collectors which are pressurised; (d) losses of charge of the flow of thermal fluid in the form of vapour.

These factors will now be considered in the present case. (a) The instabilities produced at the moments of opening of the valves 5-14 of the drawing of FIG. 5 (after the collectors have remained inactive for a long period, such as at the start of the day or the passing of clouds) would give rise to the thermal fluid being accelerated by the depression existing in the collectors. This would be resolved with the control system formed by the valves 5-2, 5-4, 5-31, the thermostat 5-3 and the pressure-stat 5-5. As a result, the fluid is deviated to the condensing tank until the design conditions are reached. So far as concerns the flow quantity to be provided for the turbine, this is kept constant by means of the system of storage and control which will be explained in greater detail hereinafter. (b) By means of the system of regulation of the flow by the solar radiation sensors 5-11, FIG. 5 which act on the valves 5-14 and as the thermal fluid is water vapour, this inconvenience is eliminated (c) Due to the geometric characteristics of the design of the receivers of the collector, this is in no way an inconvenience because the thickness of the walls for the design conditions is more than enough. (d) The losses of charge cause some losses of electrical energy for the central apparatus of the example of the order of 1 to 1.5 per cent of the enery produced.

With reference to FIG. 5, reference 5-7 denotes the collecting platforms (shown in transverse section in FIG. 2 supported at both ends in bearing support housings 5-8 (indicated at 4-1 in FIG. 4).

In order to permit the rotation of the assembly of collectors, as well as to absorb expansion, at the ends of the line of collectors there are disposed two packing glands 5-12 for hot water and pressure and 5-6 for reheated water vapour under pressure and 400 degrees Centigrade of temperature. This latter would absorb expansion and would be a labyrinth seal.

For the follow-up function there are installed pinions and wheels 5-10 moved by the hydraulic actuator 5-9, which could be a hydraulic pump, whose output of fluid under pressure effects the hydraulic group 5-24, which facilitates the control and command being obtained by means of a preprogrammed microprocessor (passive follow-up action).

The system of operation of the assembly shown in the drawing is the following. The pump 5-22 takes hot water from the degasifying regenerator 5-25 and sends it to the collector tube 5-15 passing first through the high heater 5-21. The solar collector lines take water from the collector tube through the valve 5-14 whose degree of opening is obtained by the radiation sensor 5-11, which permits a regulation of flow agreeing with the variation of intensity of the solar radiation throughout the length of the day. In order to maintain fixed the pressure in the collector tube (moments of instability mentioned hereinabove) a pressure-stat 5-16 acts on the static frequency variator 5-23 which acts on the valve 5-22 varying the rate of rotation.

To maintain the conditions of design for the thermal fluid at the entry to the turbine as well as to avoid instabilities at the moments of opening of the valves 5-14 there are installed the valves (controlled by the pressure-stat 5-15), viz. the three-way valve 8-2 (controlled by the thermostat 5-3), and the reducer valve 5-31 which has the function of maintaining a constant crop of pressure. The first have as their object to ensure that the instabilities produced by the acceleration of the fluid at the times of opening shall be of a very short period of time. The second divert the thermal fluid to the condensing tank 5-26 in case the temperature thereof should not be at the designed temperature. The third maintain the flow at the design conditions until its temperature likewise is at the design temperature.

The flow to the turbine is maintained constant by means of the system formed by the pressure-stat 5-30 which acts on the degree of opening of the valve 5-17 in such a manner that part of the flow which arrives at the collector tube 5-15 is directed to the interchanger 5-20, which heats the fluid up to the design temperature by reason of the storage system formed by the hot and cold storage tanks, 5-18.

Reference 5-19 denotes the boiler which heats the thermal fluid which is stored in the hot tank (at high temperature). Reference 5-13 denotes a valve controlled by a pressure-stat for the case that the pressure in the collector tube exceeds a predetermined value. Another auxiliary function would be the evacuation of the water from the collector tube if it should be cold after a long period of time of non-operation of the valve collection. Reference 5-29 denotes a pressure regulator (reducing valve) for the purpose of keeping the thermal fluid at the design pressure at the point of entry to the turbine. Reference 5-27 denotes the air condensor. Reference 5-1 denotes a retention valve. Reference 5-28 denotes the turbine. Reference 5-32 denotes a valve for equilibrating the system.

FIG. 6 shows the same field of collectors, but in which the thermal fluid is sodium which circulates through the interior of the receiver of the solar collectors in closed circuit and which, by means of the storage system likewise with sodium and the heat-exchanger, produce the water vapour which goes to the turbine. The corresponding portion enclosed within the broken line could be substituted for the boiler 5-19 of FIG. 5, and its function is to store thermal fluid in order to maintain the constant flow to the turbine, and which would vary in the case that this system did not exist by: (a) variation of the intensity of the radiation throughout the day, (b) the passing of clouds. (Both parts represent approximately, for the example, 43 per cent of the power of the field of collectors).

The system with sodium has a better flexibility and simplicity as regards regulation. With respect to efficiency, which in fact is interesting, in order to be able to achieve the calculated estimates which are given later herein, it is approximately the same for both fluids because the temperature of the wall of the receiver of the solar collectors in both cases is approximately the same, because although the thermal conductivity of the sodium is very high and its temperature is approximately that of the wall of the receiver (somewhat higher), it has to circulate at a higher temperature than in the case where the thermal fluid is water, due to the subsequent thermal jump in the heat-exchanger.

FIG. 7A shows the storage tank (corresponding to 5-18 in FIG. 5. Reference 7-1 of the FIG. 7 denotes the storage receiver. Reference 7-2 denotes the insulation. Reference 7-3 denotes a reflecting layer (of aluminium) in order that the radiation emitted towards the exterior shall be small. Reference 7-4 denotes the vacuum seal with reflective internal coating of aluminium or other similar material so far as concerns reflectivity, and whose purpose is to reflect the radiations emitted by the coating 7-3. Reference 7-5 shows that there has been obtained a vacuum of the order of $10^{-5}$ to $10^{-6}$ torr in the space comprised between the members 7-3 and 7-4.

As an example of the calorific losses which would occur with this system (taking a median thermal conductivity of the insulation of 0.061 Kcal/m.h. °C.) for the proportions of FIG. 7A and two tanks, one at 435 degrees Centigrade and the other at 170, each one 30, meters in length and with an internal diameter of 2.5, meters said losses per hour from the assembly under the maximum stored calories would be estimated at 0.1 per cent (external temperature of 5 degrees Centigrade).

FIG. 7B shows the system of insulation of the general tubing for flow of the thermal fluid as well as the collector tube (5-15 in FIG. 5). Reference 7-1 of FIG. 7B denotes the conduction tubing. Reference 7-2 denotes the insulation. Reference 7-3 denotes a reflecting layer of aluminium or similar. Reference 7-4 shows that there has been obtained a vacuum of approximately $10^{-4}$ torr in the space between the members numbers 7-4 and 7-5. Reference 7-5 shows the vacuum seal with the reflecting interior of a layer of aluminium or similar. Reference 7-5 shows the coupling pipes of the vacuum pumps.

In the case of sodium as thermal fluid it would be necessary to instal some electrical resistances between the tubing and the insulation in order to liquefy it after a period of inactivity of the collectors which would give rise to a lowering of temperature of the sodium and its consequent solidification.

For a thermal insulation 7-2 of average thermal conductivity of 0.061 Kcal/h.m. °C., the losses of thermal energy in relation to that which arrives at the turbine represent an order of one per cent (for the proportional relationships of the drawing and an external temperature of 5 degrees Centigrade).

FIG. 7C shows the arrangement of a field of collectors with an electrical power averaging of the order of 5 MW. Reference 7-1 of said figure shows the lines of solar collectors with water, or water vapour, as thermal fluid. Reference 7-2 shows the lines of solar collectors with sodium as thermal fluid. Reference 7-3 shows the building in which are installed the turbo-alternator group, the storage equipment, fee pumps, the olio-hydraulic group, and auxiliary equipment.

There will now be described with reference to FIGS. 8 to 28 a second main aspect of the invention.

As is shown in these figures and more particularly in FIG. 8 the receiver of equilateral triangular section is surrounded by points corresponding to the ellipse:

$$X^2/46.09^2 + Y^2/30^2 = 1$$

$$X^2/100.72^2 + Y^2/73.05^2 = 1$$

referred to its axes. In this figure there are shown by means of crosses the points at which there must be situated the centres of circumferences in order to approximate the elliptical arcs by circumferential arcs.

For the elliptical arcs, all the rays which start from the perimeter of the receiver, upon being reflected on said arcs, return to points of the said perimeter.

For the circumferential arcs, although because of the scale of the drawing it is not possible to appreciate the difference from elliptical arcs, analytically it is manifest that approximately 5% of the rays which depart from the perimeter of the receiver, upon being reflected on the circumferential arcs, do not return to points of the said perimeter. For this reason there is obtained a better yield using the elliptical arcs as a receiver enclosure, which arcs can constructively be approximated by arcs of curves of the family of the cycloids, especially the hypocycloids, lengthened or shortened, which coincide with the ellipses, such that construotively a machine which in its advancing movement describes an ellipse (or hypocycloid shortened or lengthened) is easily constructable.

In FIGS. 9 and 10 there are seen equilateral triangles enclosed by a circumference concentric with the said triangle and by an enclosure formed by the corresponding elliptical arcs.

Although both enclosures are very similar, upon tracing the rays which start from the perimeter of the receiver, or triangle, in the case of the circumference it will be seen that approximately 25% of the rays which start from the perimeter of the receiver, upon being reflected on the circumference do not return to points of the said perimeter, so that the temperature of the receiver, or what is the same thing the yield of the same, surrounded by the reflecting enclosure, according to an example of construction in which its section is that of a triangle enclosed by a circumference concentric with it, is much less than that which is obtained with elliptical arcs, in which case all of the rays which start from the receiver upon being reflected on such elliptical arcs return to points of its perimeter. This is extremely important if it is taken into account that, for radiations of long wave length, the selective coatings of the receiver have a very low coefficient of absorption, of the same order as that of the reflecting coating of the enclosure, which gives rise to a loss of a large percentage of the radiation, since it is necessary to have a large number of strikes of the radiation on the receiver in order that it shall be absorbed by the latter.

In the case of regular polygons surrounded by circumferences concentric therewith which pass through the vertices of joining of the extension of its edges, as for example is shown in FIGS. 11 and 12, it is the sole case in which all of the rays which start from the receiver perimeter, upon being reflected on said circumference, return to points of said perimeter. In the case of the pentagon, shown in FIG. 11, there exists a circumference which fulfils said condition; in the hexagon, heptagon and octagon, two; in the nonagon and decagon (FIG. 12), three; in the undecagon and dodecagon, four; etc. . . . , and for the case of a regular polygon of an infinite number of sides (circumference) it fulfils the condition for any other circumference concentric with it.

In the cases shown in FIGS. 13 and 14, corresponding to a receiver constructed in a rectangle and in a triangle, both very much elongated, surrounded by the corresponding elliptical arcs, it is achieved that all the rays which start from the perimeter of the receiver, whether rectangular or triangular, upon being reflected on the enclosure (elliptical arcs) return to points of the said perimeter of the receiver.

In these figures there can be seen the difference of shape and of the enclosure with respect to a circumference concentric with the polygon, which shape is more apparent for regular polygons and which coincides, by transformation, for infinite sides, into the known case of one circumference concentric with another. The advantage of the polygonal receivers, as compared with the circumference, is that they have a lesser perimeter in order to catch a beam of rays of the same width in both cases. This gives rise to the fact that the emission of energy will be less and, consequently, also the yield or the temperature that the collector can achieve will be greater above all for plane polygons which enclose a diameter of a circumference.

In FIG. 15 there is seen an edge or face of the perimeter of the receiver, with the corresponding elliptical arc in front of it, in a case in which the focal distance of the said elliptical arc is the said edge, and it can be seen in that figure how the ray which enters across the window undergoes various strikings against the receiver before returning to pass out through the said window.

However, in FIG. 16, which has shown the same example, but with a difference that, in accordance with the improvements of the present certificate of addition, the connection of the vertices of the polygon or the end points of the set have been obtained by means of a curved line, and particularly a concave curve, the successive reflections of the ray are found to be moved towards the central zone, in a manner to permit a greater number of strikings on the receiver without the said ray escaping through the window. This in turn results in the greater part of the rays which start from an edge being reflected and returning to points of the said edge, which is especially important for edges which are not in front of windows.

In FIGS. 17 and 18 there is shown how the windows must be situated in relation to the sector, in order that the rays which enter through them shall be deflected upon striking this latter, near zones of the elliptical arcs in which no windows exist.

As a result of the configurations shown in FIGS. 16 and 18, there is achieved the high yield which permits the retaining of the receivers of the type which are polygonal and surrounded by reflecting arcs, for inclined rays or rays which are at a distance from the perpendicular at the point of incidence with the polygonal surface, so that the absorption of the selective coating is less in proportion as the solar ray departs from the perpendicular at the point of incidence on the surface of the receiver. Therefore, in proportion as the inclination of the rays is greater, departing from the said perpendicular, the percentage of radiation which "rebounds" on the receiver, without being absorbed, is greater.

In the configuration of the receiver and the windows is like that indicated in these figures, the ray upon rebounding in the receiver will strike against the elliptical arcs and will return to the said receiver, instead of passing out through the windows, said ray being absorbed in a number of successive strikings.

Normally the number of strikings against the receiver can be considered as being of the order of three in order that there shall be absorption of the greater part of the energy carried by the ray or beam of rays.

If it is taken into account that the absorption of the aluminium or the silver which coats the arcs of the enclosure is small for solar radiation, the total losses in the three successive strikings is of the order of 13 and 7% respectively, so that these configurations permit high yields to catch oblique solar radiation, like those which are obtainable with tracking of the sun in a single axis of rotation, with north-south orientation, even for sites of latitude distant from the equator and in the most unfavourable periods of the year, or with tracking of mirrors in two rotational axes (heliostats) in the enclosure which surrounds the receiver, in longitudinal direction. This makes even more apparent the differences of the receivers with polygonal section in comparison with the circumferential (or regular polygons of a large number of sides).

In FIG. 19 there is shown in elevation and in transverse section the abovementioned practical construction of a single collector on a structure, in place of three as in the previous form. Said triangular receiver has been denoted by reference 19-1 and rotated with respect to the position which appears in the patent, for the reasons indicated earlier, whilst the reference 19-2 corresponds to the reflecting concentrating mirrors, and the reference 19-3 corresponds to the refracting concentrating mirrors or Fresnel lenses. The reflecting enclosure constituted by a plurality of curved arcs has been denoted by reference 19-4, and in its interior there has been produced a vacuum, it being provided with windows which permit the passage of the radiation concentrated towards the receiver 19-1.

The reference 19-5 indicates the connecting conduit for producing the vacuum referred to above.

The rays concentrated by the mirrors have been symbolised by arrows.

In FIG. 20 there is shown a representation similar to that of the preceding figure but corresponding to a collector in which the single receiver 20-1 has a polygonal section of four sides, and there have been similarly referenced the reflecting mirrors as 20-2, the refractors as 20-3, the reflecting enclosure as 20-4 and the conduit for forming the vacuum as 20-5.

As similar representation, corresponding to a collector in which the receiver 21-1 has a polygonal section of five sides, is apparent in FIG. 21.

In FIG. 22 there is shown a collector which, instead of being on a platform with tracking of the sun on a single axis of rotation, has the receiver and the enclosure supported on the ground and the mirrors follow the sun on two axes of rotation. The reference 22-1 corresponds, as in the previous cases, to the receiver surrounded by the enclosure 22-4, these members remaining fixed with respect to the ground and being supported by the structure 22-6 carried on the latter, whilst the reflecting mirrors 22-2 follow the sun on two rotation axes. In all other respects, the system is the same as in the previous cases.

The rays concentrated by the assembly of the concentrating mirrors seen in section form a wedge, as in the case of collectors on a platform, and the receiver is also polygonal and surrounded by a reflecting enclosure 22-4 constituted by elliptical arcs, and there has also been a vacuum formed in its interior. In this figure there has not been shown the vacuum coupling conduit, inasmuch as it could be situated in extension of the ends of the enclosure, in the longitudinal direction.

In FIG. 23 there is seen how the connection between the collectors on the structural platform is obtained, the reference 21-11 corresponding to the bearing housing, the reference 23-12 to the hollow shaft above it which is hung from the structure, the reference 23-8 corresponding to a sliding bearing of the receiver 23-1 with the proviso that if said collector is sole on the structure, the receiver when expanding can slide in the interior of the shaft 23.2. with elimination of the expansion element which is referenced as 4-7 in FIG. 4 of drawings of the previous embodiment. There have also been eliminated the collars 23-4 in order to obtain that the receiver can slide in the interior of a hollow shaft of small diameter, for which purpose the various sections of the receiver will have to be threaded or welded. In view of what has been set out above there are also eliminated many elements shown in the preceding figures, such that the reflecting enclosure which surrounds the receiver reaches the hollow shaft, and, as a result, also the concentrating mirrors, thus eliminating the sections provided for expansion.

In the detail enlarged in FIG. 24 it will be seen how the receiver 17-1 is surrounded by the insulation 17-23, from which project the sliding shoes 17-8 which likewise permit the standing of the receiver on the shaft. Between the shoes and the shaft there can be applied a solid lubricant in order to facilitate the sliding, such as molybdenum bisulphide, or a fine film of this compound which supports high temperatures.

Between the insulation 17-23 and the shaft 17-13 there has been obtained a vacuum in order to eliminate thermal losses, as well as to avoid the heating of the bearings.

In the section of FIG. 25 it can be seen how the receiver 25-1 rests on the enclosure 25-4 which, in this example, has been constructed from a single piece in order to avoid losses of the vacuum, which can be manufactured in practice by means of moulding of transparent material, with internal reflecting hood.

The receiver 25-1 rests on the enclosure 25-4 by means of rods 25-7 connected to said receiver and which connect to the enclosure by means of resilient abutments 25-8, in order to permit the difference of expansion in transverse direction between the enclosure and the receiver with rods.

The surface in contact with the receiver (external ends of the resilient abutments) can be of Teflon or any other material which facilitates the sliding of the abutment on the enclosure.

The rods with resilient abutments can also be constructed with telescopic rods with internal springs.

In the drawings of the collectors these abutments have not been shown, for better clarity, due to the showing in this zone of the concentrated solar rays.

The enclosure in its turn rests on an element 25-41 which in its turn rests on the structure. Between the enclosure 25-4 and the abutment 25-41 it is possible to couple a resilient joint in order to permit the differences of expansion between said element and the enclosure, as well as to coat it with material which facilitates sliding, such as the Teflon referred to above.

In FIG. 26 there has been shown an enlarged detail of the receiver 24-1 of FIG. 24 surrounded by the enclosure 26-4 in which there is also shown the beam of rays coresponding to the most unfavourable mirror the most distant one), in order to observe the aperture of the window of the enclosure.

The internal conduit of the receiver has been represented by a large circle. Due to the large capacity of the receiver, the internal conductor can be substituted by a serpentine for fluids of high thermal conductivity, such as sodium, the conduit shown being appropriate for gases or other fluids of small conductivity.

In FIG. 27 there is shown the collector with heliostats of FIG. 22, there being referenced with 27-2 the heliostats themselves, with 27-4 the enclosure, and with 27-44 the windows, whilst the reference 27-42 corresponds to the flows of fluid which pass through the interior of the receiver. The reference 27-43 corresponds to the building wherein are installed the stoarage equipment, turbo-alternator assembly, etc.

Finally, in FIG. 28 there is shown the same assembly of the previous figure in plan view, and in it there will be seen the surface occupied by the heliostats 28-2, as well as the directions of the rays concentrated by the various heliostats distributed on said surface.

The collectors of a single module have the advantage of easy manipulation, by reason of its great accessibility, which also gives rise to less constructional errors by the possibility of adjusting the various elements of the collector such as concentrators.

The collectors with heliostats, although they have the disadvantage of a more sophisticated tracking system, and as a result are most costly, offer as a compensation a greater precision of setting up, that is to say the deviations of the rays are very small.

With the structure described it will be evident that the collectors can achieve high ranges of temperature and, consequently, a high degree of economy.

There could be variation of the shapes and dimensions and all that of secondary character which does not essentially alter the fundamentals of the system described.

The terms in which this specification has been written must be taken in a broad sense and not in any limiting manner.

There will not be described with reference to FIGS. 29 to 37, a third main aspect of the present invention.

Upon viewing these figures, and more particularly FIGS. 24 to 30, one can see how the system of mirrors with double reflection has a constructive arrangement such that said mirrors are installed in the upper part of the collector, in substitution for the conventional Fresnel lenses. Both systems are constituted by a first parabolic mirror 29-1 and a second plane mirror 29-2.

There is thus avoided the problem of the Fresnel lenses, consisting in that when the solar radiation incident on the lens is not parallel to its optical axis, the focal distance is shortened and, consequently, its field of use for collectors with a single axis of tracking of the sun remains restricted to sites situated about the equator, and also there is a small positional inclination of the said lens, so that in the other cases the yield or temperature reached by the collector is a long way from being uniform throughout the year.

A solar collector constructed in accordance with the improvements which are provided can be used with tracking of the sun in its single axis and with tracking the sun in two axes, and there exist in this latter case two other possibilitites: tracking in two axes of mirrors or heliostats and with a fixed receiver, or again tracking in two axes of the collector, as well as the receiver and the mirrors, and both can be supported in the same structure.

The fundamental advantages of the collector with tracking of the sun in a single axis, as compared with tracking in two axes, centres on the fact that it is necessary to have a smaller number of motors and enclosures, with their corresponding supports. In this direction, for each tracking collector or heliostat with two axes there are necessary two motors, one for each tracking, and three bearings for their corresponding supports, whilst in the case of collectors with tracking in a single axis, such as those for which the improvements of the present invention are provided, it is only necessary to have a single box of bearings for each collector and one motor for each twenty or more collectors.

For the above-mentioned economic reasons, as well as for the limitations of the Fresnel lenses, the design of the concentrators is improved by substituting the said lenses by any of the reflecting mirrors shown in FIGS. 29 and 30.

The substitution of the Fresnel lenns by the double reflection mirror system permits to maintain the structural condition embodiments described hereinbefore with the advantages of distribution of the concentration of the solar radiation over various mirrors, in such a manner that the wedges which the concentrated rays form (seen in section) for each mirror form relatively small angles, and there is also a good superficial use of the stucture when installed on the enclosure which surrounds the receiver, which enclosure has to be of large dimensions because upon increasing the distance betwen the perimeter of the enclosure, the angle which each point of the perimeter of the receiver has for its vertex, and for the edges the junction of said point with the lateral sides of the windows, diminishes so that the effectiveness of the insulation of the radiation by means of the enclosure increases, as will be easily seen in FIG. 31, in which there is taken into account the deviations of the rays with respect to the theoretical. Another advantage obtained centres on a greater facility of distribution of weight, such that the centre of gravity coincides with the centre of rotation without the necessity of having recourse to dead weights for balancing it.

In FIG. 31 there has been shown, in transverse section, a collector of a single module on a structure, with double reflection mirror system, the first reflection being by means of a parabolic concentration mirror 31-1 and the second by means of a plane mirror 31-2, there being provided a second parabolic mirror 31-1 assisted by a second plane mirror 31-3 and repeating this construction of symmetrical nature in the two halves of the structure. In said figure the receiver is referenced as 31-3, the reference 31-4 corresponding to the enclosure of the said receiver 31-3, and the reference 31-5 being the vacuum connection.

The broken lines represent the deviations of the rays with respect to the theoretical paths, which have been shown in continuous lines.

The double reflection has the disadvantage that it is necessary to have a greater surface to catch the same quantity of radiation and, as a counterpart, the advantage of greater possibilities so far as concerns the design of the structure of the collector in that the mirrors can be disposed in various positions.

The construction of the collector which is shown in FIG. 31 is constituted basically by two similar girders situated at the sides of the enclosure which surrounds the receiver, which permits the collector to have a great length, as a result of which there is a reduction of the occurrence of cost of anchoring, supporting structure, bearing housings, connecting structure and hollow shaft, as compared with the previously described constructions for each square metre of mirror surface.

By reason of this great length it is essential that the receiver shall be supported at various points on the enclosure, in order to avoid bulging effects in the same.

In FIG. 32 there appears a system of mirrors with double reflection, as in FIG. 29, based on the parabolic mirror 32-1 and the plane mirror 32-2, there being shown in said figure by means of broken lines the deviation in both directions that can be suffered by the rays, with respect to the theoretical paths shown in continuous lines, which deviations are due to errors produced by imperfections of technology, like those produced in the tracking of the sun or due to the operational construction itself, such as unlevelling of the seatings of the parabolic mirrors with respect to their theoretical position, torsion in the structure, etc. In FIG. 33 there will be seen perfectly how these deviations are corrected by displacing the plane mirror 33-2 parallel to itself.

In FIG. 34 with a schematic representation similar to that of FIG. 32 there are shown the deviations in both directions of the rays, with respect to the theoretical paths, due to errors of assembly of the plane mirror, as a result of installing it in a position inclined with respect to the theoretical position. In like manner it will be seen in FIG. 35 how such deviations are corrected by displacing the plane mirror 35-2 parallel to itself.

On the lines of the earlier figures it is evident that by displacing the plane mirror parallel to itself all of the errors are corrected but in reality this is only possible with tracking of the sun, by the collector about two axes. With tracking of the sun on a single axis, due to the great longitudinal dimension, the mirrors have to be divided into various sections, each one of them giving rise to difference errors of levelling. Further, with tracking on a single axis there are produced oblique rays, and so part of the rays concentrated by the parabolic mirror would be reflected by the plane mirror which was not in front of it, which then requires that all of the line of plane mirrors shall be in a continuous succession, forming a continuous mirror, that is to say that, seen transversely, the first mirror considerably masks all of the others.

Given that, as has been said above, the design which is most interesting from the economic point of view is that which corresponds to tracking of the sun on a single axis, there are analysed hereinafter the errors which are produced with this system and the forms of construction necessary to avoid them.

In the first place, to detect and control such errors it is necessary to introduce sensor elements which detect the deviations of the rays, for which purpose there are installed photosensitive elements on the sides of each window, in such manner that each element catches the deviations in one direction. Due to the fact that the rays concentrated by the systems of mirrors pass through different windows of the enclosure, the regulation is of great simplicity because each of the photosensitive elements corresponds with each system of mirrors.

The errors which are produced, and the manner of correcting them are the following.

Differences of level of the supports of the parabolic mirror may occur. These errors are corrected by means of an adjustable system of support of the mirror at three points.

Errors due to the inclination of the plane mirror as compared with its theoretical position may occur. These are corected by displacing this mirror parallel to itself, in regard to which it will be necessary to provide sufficient space to permit said displacement, as well as the means necessary to carry out the same. An error of a quarter of a degree sexagesimal in the inclination of the mirror presupposes a displacement thereof, to correct it, of approximately 15 mm. as a result of which due to this amplification the errors become ascertainable upon simple inspection.

There may occur errors due to the fact that, upon joining some collectors to others, forming the desired line, the structures are found to be turned, some with respect to others. These errors are corrected by displacing the assembly of plane mirrors of each collector parallel to themselves, for which purpose it is necessary to provide greater space and means in the collector to permit this displacement to be made. The errors are more ascertainable upon simple inspection than in the previous case, because they necessitate a greater displacement of the plane mirror.

This system does not correct the errors completely, due to the oblique rays. For the prototype of the collector shown in the example of FIG. 36, situated at latitude 40° north, in the month of December (the most unfavourable period), there are losses of capturing of the solar radiation of the order of 5%.

Errors due to solar tracking may occur. Considering the line of collectors with north-south orientation, the tracking would be very simple by using a suitably programmed microprocessor which rotates the collector per unit of time. To avoid errors this movement of rotation has to be as continuous as possible. As there is installed a motor for each twenty platforms, the incidence of its cost per square metre of surface of the mirror is very small, so that it can be a motor with various stages of reduction, in such a manner that it permits movement of up to one minute of arc. In order to give an idea of this reduction, considering a very slow motor, such as some hydraulic ones which turns at 25 r.p.m., it would be necessary to provide a reduction of 1/1500 in order to achieve a movement of one minute of arc. In any event, it is not necessary to achieve such great precision. On the other hand, the motor connected to the radiation sensors will form a floating system of adjustment of the errors.

Errors due to the wind may occur. So far as concerns deformation of the structure, this is sufficiently rigid to avoid such deformations. So far as concerns errors produced by oscillations of the whole of the structure, it would be possible to practically eliminate them by means of the floating system of error correction formed by the motor in combination with the radiation sensors. Therefore, it would not be necesary to have recourse to elements for absorbing vibrations.

Errors due to lack of specularity of the reflecting surfaces, may occur due to deposition of dirt on them.

These errors are already included in the calculation of losses.

Errors may occur due to the fact that the rays in reality do not form a line but form an angle.

The theoretical rays represented by a line in reality are bunches of rays which form an angle of half a degree. These errors cannot be eliminated and give the minimum measure of dimensions of the receiver. Thus, for the case of the example shown, considering the collector situated at latitude 40° north and considering the month of December, the most unfavourable due to the fact that there is a greater tendency of the rays to be oblique, for the system of mirrors assembled in the upper part the minimum length to intercept the bundle of rays would be approximately 6 Cm.

Optical errors of shaping of the mirrors may occur. It is considered that these errors give rise to an increase of the length necessary to intercept the bundle of rays, considered in the front compartment, of 25% Thus, for the previous case the magnitude of six centimetres would have to be increased to 7.5 Cm.

In the collector shown in FIG. 36, similar to that of FIG. 31, there have also been included the elements for adjustment for the parabolic mirrors, a larger structure with the constructive elements 36-6 necessary to permit the displacemont of the plane mirrors 36-2 parallel to themselves, the radiation sensor elements 36-7 situated at the sides of each window which surrounds the receiver 3613, and the receiver 36-3 itself similar to that of FIG. 31 but of less dimensions.

This considerable reduction in the collector 36-3 is due to the correction of the errors possible in the solution of FIG. 36 by means of the elements 36-6 for displacement of the mirrors 36-2, and which do not exist in the solution of FIG. 31 by reason of lack of such elements, and it is essential that the collector absorbs said errors by means of a larger surface area. But the difference of dimensions would have to be still greater if it were not for the fact that in the example of construction shown in the previous figure each motor moves only three platforms, so that on the contrary the error specified in the third type of errors would require that the dimensions of the receiver be even greater, inasmuch as errors of this type are cumulative.

Although the field of application of the developed collectors is very wide, the design and calculation of said collector has been centred on the obtaining of thermal fluids at temperatures greater than 400° C., as well as in the obtaining of solar centres of large dimensions, for which purpose there have been designed different prototypes which fulfil these premises, because it is in these conditions where there exist most possibilites economically for practical application. Examples of what has been set out above are thermal centres for steam, petrol distilleries, distilleries for coke at low temperature, distilleries for lignite at low temperature etc., which operate with temperatures comprised between 400 about and 600 about Centigrade.

The thermal centres or industries cited above generally incorporate a boiler and sometimes also a turbine. If, in its surroundings, there already exists sufficient space for the installation of the solar collectors, these will substitute for the boiler, the latter remaining as an auxiliary heat source for days of adverse climatic conditions, as a result of which the thermal storage necessary for this type of installations would be considerably reduced.

This economic calculation, in accordance with the above, is reduced to comparison between the cost of the collectors and thermal storage in relation to consumption of fuel.

So far as regards the collector, the fundamental prototype is centred on the system of tracking on a single axis, which fulfils the above conditions, because this system is considerably cheaper than those having tracking on two axes.

With the improvements forming the object of the invention and in agreement with an assembly such as that shown in FIG. 8, there can be achieved absorptions of enery of the order of 98%, for Chrome black, and furthermore there can be used collectors, in the high temperature sections of the line of collectors, in the high temperature sections of the line of collectors, with other coatings selective of lower absorption and thus having a lower emission, improving to a considerable extent the yield of the collectors, that is to say minimising losses by radiations emitted by the receiver. On the other hand, the system of adjustment of the collector avoids errors, thereby permitting the reduction of the dimensions of the receiver and diminishing even more the losses by radiations emitted by the same.

With the collector of FIG. 36 it is possible to obtain temperatures greater than 600°, with good yields, because the insulations designed into the principal part would be usable as thermal accumulators at such temperatures, it not being necessary to have a first insulating cover of such thickness as is shown in the drawings. For lower temperatures, the conventional insulations are more useful.

So far as concerns the obtaining of electrical energy, the turbines at 540° C. have a yield which is greatly superior to that calculated in the example.

It will be appreciated that the invention is not restricted to the particular features specifically disclosed above and that many modifications and variations can be made without departing from the scope of the invention in its various aspects.

I claim:

1. A solar radiation collector comprising a horizontally elongated receiver through which a medium to be heated by solar radiation passes in a direction parallel to the length of said receiver, a concentrator for concentrating solar radiation onto said receiver, and an intermediate device positioned between said concentrator and said receiver for reducing energy losses due to radiation emitted by said receiver, said intermediate device surrounding and completely enclosing said receiver and having a uniform cross sectional configuration along portions of length parallel to the length of said receiver and having at least one elongated closed transparent window parallel to the length of said receiver for transmitting solar radiation focussed by said concentrator onto said receiver, said intermediate device having reflective arcuate surfaces for reflecting said solar radiation reflected from said receiver back onto said receiver and onto other arcuate surfaces of said intermediate device thereby to reduce the amount of radiation existing through said window, said concentrator comprising at least one concave mirror disposed below said receiver and outside said intermediate device, said mirror being horizontally elongated in the direction of and parallel to said receiver and having a cross-sectional configuration that is uniform along its length, and means mounting said receiver and concentrator and intermediate device for rotation about a single axis of rotation for tracking the sun, said axis of rotation comprising a longitudinal axis of said receiver.

2. A solar radiation collector according to claim 1, wherein said concentrator comprises two of said mirrors both of which are disposed below said receiver.

3. A solar radiation collector according to claim 1, said collector including means disposed above said receiver for concentrating solar radiation on said receiver.

4. A solar radiation collector according to claim 1, there being an evacuated space between said intermediate device and said receiver.

5. A solar radiation collection as claimed in claim 4, the pressure in said space being about 10 torr.

6. A solar radiation collector comprising a horizontally elongated receiver through which a medium to be heated by solar radiation passes in a direction parallel to the length of said receiver, a concentrator for concentrating solar radiation onto said receiver, and an intermediate device positioned between said concentrator and said receiver for reducing energy losses due to radiation emitted by said receiver, said intermediate device having a uniform cross sectional configuration along portions of length parallel to the length of said receiveer and having at least one elongated window parallel to the length of said receiver for transmitting solar radiation focussed by said concentrator onto said receiver, said intermediate device having reflective arcuate surfaces for reflecting said solar radiation reflected from said receiver back onto said receiver and onto other arcuate surfaces of said intermediate device thereby to reduce the amount of radiation exiting through said window, said concentrator comprising at least one concave mirror disposed below said receiver and outside said intermediate device, said mirror being horizontally elongated in the direction of and parallel to said receiver and having a cross-sectional configuration that is uniform along its length, and means mounting said receiver and concentrator and intermediate device for rotation about a single axis of rotation for tracking the sun, said axis of rotation comprising a longitudinal axis of said receiver, said collector including means disposed above said receiver for concentrating solar radiation on said receiver, said means disposed above said receiver comprising at least one fresnel lens.

7. A solar radiation collector comprising a horizontally elongated receiver through which a medium to be heated by solar radiation passes in a direction parallel to the length of said receiver, a concentrator for concentrating solar radiation onto said receiver, and an intermediate device positioned between said concentrator and said receiver for reducing energy losses due to radiation emitted by said receiver, said intermediate device having a uniform cross sectional configuration along portions of length parallel to the length of said receiver and having at least one elongated window parallel to the length of said receiver for transmitting solar radiation focussed by said concentrator onto said receiver, said intermediate device having reflective arcuate surfaces for reflecting said solar radiation reflected from said receiver back onto said receiver and onto other arcuate surfaces of said intermediate device thereby to reduce the amount of radiation exiting through said window, said concentrator comprising at least one concave mirror disposed below said receiver and outside said intermediate device, said mirror being horizontally elongated in the direction of and parallel to said receiver and having a cross-sectional configuration that is uniform along its length, and means mounting said receiver and concentrator and intermediate device for rotation about a single axis of rotation for tracking the sun, said axis of rotation comprising a longitudinal axis of said receiver, said collector including means disposed above said receiver for concentrating solar radiation on said receiver, said means disposed above said receiver comprising a concave mirror of uniform cross-sectional configuration elongated in the direction of the length of the receiver, and a plane mirror disposed below and receiving rays from the last-mentioned concave mirror and directing said rays onto said receiver.

8. A solar radiation collector according to claim 7, there being a pair of said concave mirrors disposed above said receiver back-to-back and facing away from each other and downwardly inclined toward respective said plane mirrors, said plane mirrors being disposed on opposite sides of said receiver and confronting each other.

* * * * *